(12) United States Patent
Kameoka et al.

(10) Patent No.: US 12,030,521 B2
(45) Date of Patent: Jul. 9, 2024

(54) PATH GENERATION DEVICE AND VEHICLE CONTROL SYSTEM

(71) Applicant: Mitsubishi Electric Corporation, Chiyoda-ku (JP)

(72) Inventors: Shota Kameoka, Tokyo (JP); Tomoki Uno, Tokyo (JP); Shunsuke Nakajima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 197 days.

(21) Appl. No.: 16/967,282

(22) PCT Filed: Mar. 23, 2018

(86) PCT No.: PCT/JP2018/011721
§ 371 (c)(1),
(2) Date: Aug. 4, 2020

(87) PCT Pub. No.: WO2019/180919
PCT Pub. Date: Sep. 26, 2019

(65) Prior Publication Data
US 2020/0385018 A1    Dec. 10, 2020

(51) Int. Cl.
*B60W 60/00*    (2020.01)
*B60W 30/045*    (2012.01)
*B60W 40/072*    (2012.01)

(52) U.S. Cl.
CPC ...... *B60W 60/0011* (2020.02); *B60W 30/045* (2013.01); *B60W 40/072* (2013.01); *B60W 2552/30* (2020.02); *B60W 2710/207* (2013.01)

(58) Field of Classification Search
CPC .......... B60W 60/0011; B60W 30/045; B60W 40/072; B60W 2552/30; B60W 2710/207;
(Continued)

(56) References Cited

U.S. PATENT DOCUMENTS 9,789,905 B2    10/2017   Matsuno et al.
9,880,555 B2 *    1/2018   Lynch .................. B62D 15/025
(Continued)

FOREIGN PATENT DOCUMENTS

JP    2006-292653 A    10/2006
JP    2007-331715 A    12/2007
(Continued)

OTHER PUBLICATIONS

Translated version of JP-5387106-B2 (Year: 2014).*
(Continued)

*Primary Examiner* — Aniss Chad
*Assistant Examiner* — Christopher George Fees
(74) *Attorney, Agent, or Firm* — XSENSUS LLP

(57) ABSTRACT

A path generation device and a vehicle control system capable of inhibiting generation of paths that make a vehicle unstable are provided. The path generation device includes a path generator that generates a plurality of paths along which a vehicle is to travel, in association with each piece of environment measurement data about a travel environment of the vehicle detected by a plurality of detectors; a reliability setting part that sets, for each of the generated paths, the reliability of the path in itself, the reliability corresponding to the degree to which a variation in the path falls within a predetermined range, and a path-weight setting part that sets the weight of each path on the basis of the reliability of the path.

18 Claims, 15 Drawing Sheets

(58) Field of Classification Search
CPC ....... B60W 2050/0025; G01C 21/3407; G08G 1/167
See application file for complete search history.

(56) References Cited

U.S. PATENT DOCUMENTS

| | | | | |
|---|---|---|---|---|
| 10,843,711 | B2* | 11/2020 | Takagi | G01C 21/26 |
| 10,877,482 | B2* | 12/2020 | Kindo | B60W 50/0097 |
| 2008/0270018 | A1* | 10/2008 | Citelli | B60W 40/02 |
| | | | | 701/532 |
| 2009/0093924 | A1* | 4/2009 | Aso | B60W 40/10 |
| | | | | 701/31.4 |
| 2012/0323473 | A1* | 12/2012 | Irie | B60W 30/12 |
| | | | | 701/117 |
| 2013/0141520 | A1* | 6/2013 | Zhang | G06V 20/588 |
| | | | | 348/149 |
| 2016/0259335 | A1 | 9/2016 | Oyama | |
| 2017/0123434 | A1* | 5/2017 | Urano | G08G 1/096791 |
| 2017/0261984 | A1* | 9/2017 | Ichikawa | B60W 50/14 |
| 2018/0022382 | A1* | 1/2018 | Akatsuka | B62D 5/008 |
| | | | | 701/41 |
| 2018/0136662 | A1* | 5/2018 | Kim | B60W 60/0011 |
| 2018/0292834 | A1* | 10/2018 | Kindo | B60W 30/10 |
| 2020/0223449 | A1* | 7/2020 | Tsuji | G08G 1/096758 |

FOREIGN PATENT DOCUMENTS

| | | | |
|---|---|---|---|
| JP | 2010-126077 | A | 6/2010 |
| JP | 2010-244434 | A | 10/2010 |
| JP | 2011-95914 | A | 5/2011 |
| JP | 2011-189803 | A | 9/2011 |
| JP | 2013-129289 | A | 7/2013 |
| JP | 5387106 | B2 * | 1/2014 |
| JP | 2016-162299 | A | 9/2016 |
| JP | 6055525 | B1 | 12/2016 |
| JP | 2018-22353 | A | 2/2018 |
| WO | WO 2017/130397 | A1 | 8/2017 |
| WO | WO-2017130397 | A1 * | 8/2017 |

OTHER PUBLICATIONS

Translated version of WO-2017130397-A1 (Year: 2017).*
1 Office Action issued on Mar. 3, 2022, in corresponding Chinese patent Application No. 201880090837.6, 32 pages.
International Search Report issued Jun. 26, 2018 in PCT/JP2018/011721 filed on Mar. 23, 2018, 2 pages.
Chinese Office Action issued Oct. 31, 2022, in corresponding Chinese Patent Application 201880090837.6, 32 pp.

* cited by examiner

FIG. 12

| Rg > Thg | Rc > Thc | Rr > Thr | PROCESSING |
|---|---|---|---|
| true | true | true | LANE DEVIATION DETERMINATION USING GNSS SENSOR AND NAVIGATION DEVICE |
| true | false | true | |
| true | true | false | |
| false | true | true | LANE DEVIATION DETERMINATION USING FORWARD CAMERA |
| false | false | false | STOP AUTONOMOUS DRIVING |
| else | | | WEIGHT SETTING |

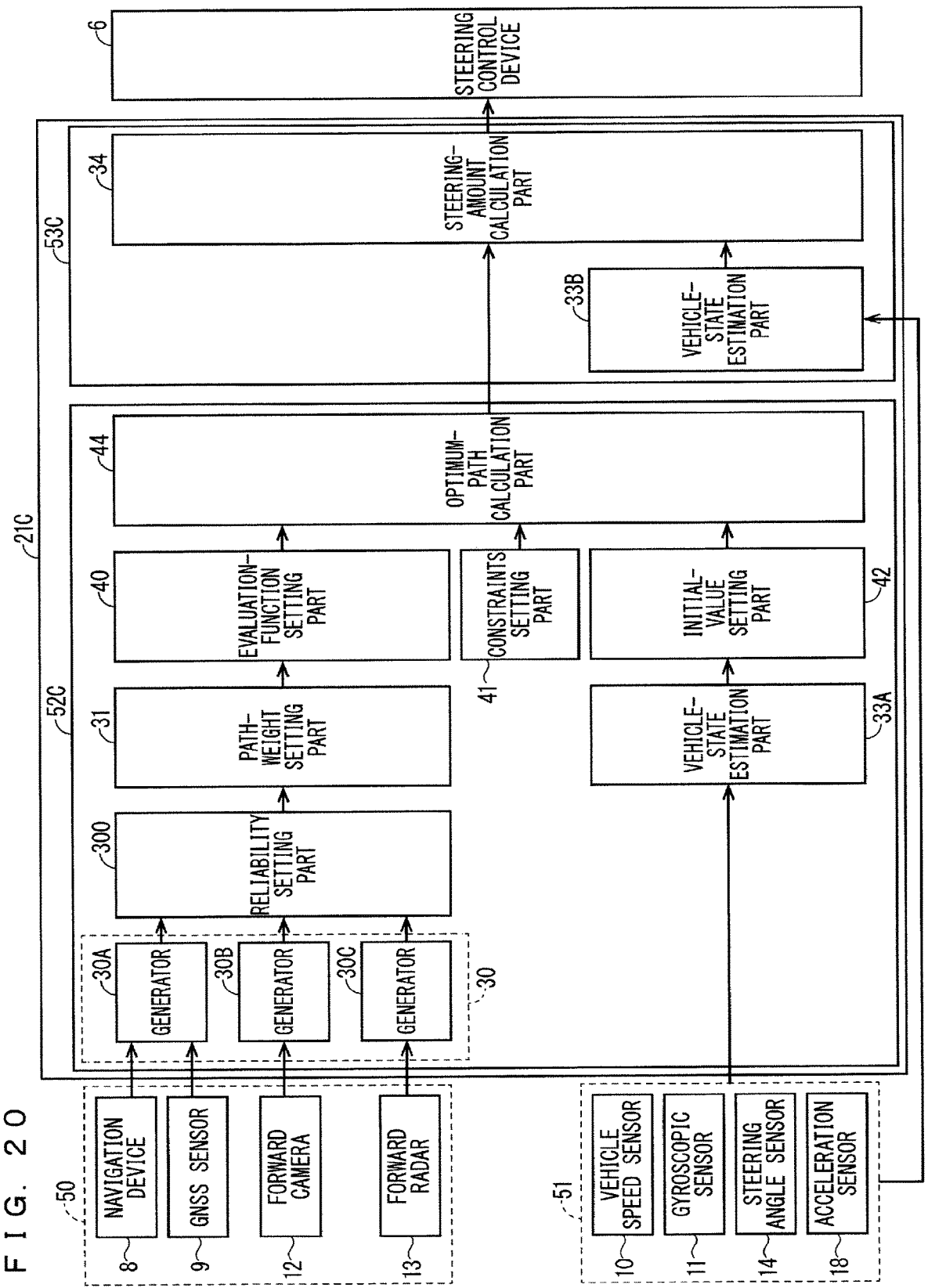

PATH GENERATION DEVICE AND VEHICLE CONTROL SYSTEM

TECHNICAL FIELD

The technique disclosed in the specification of the present application relates to a path generation device and a vehicle control system.

BACKGROUND ART

In order to achieve autonomous driving of a vehicle, a conventional vehicle control device firstly generates a targeted path (i.e., target path) and obtains a target steering angle of the vehicle so as to allow the vehicle to follow the target path. The vehicle control device then controls driving of the vehicle such that the actual steering angle of the vehicle follows the obtained target steering angle.

Examples of techniques for generating a target path include a technique for recognizing the edge lines of a lane with image sensors, and a technique for recognizing a path of the preceding vehicle to be followed, with a global navigation satellite system (GNSS) and a forward radar equipped with a vehicle.

For example, Patent Document 1 achieves highly accurate vehicle control by assigning reliability to road information obtained by an image sensor or a GNSS sensor and changing the ratio of adoption of output information from each sensor depending on the reliability.

PRIOR ART DOCUMENT

Patent Document

Patent Document 1: Japanese Patent No. 6055525

SUMMARY

Problem to be Solved by the Invention

Such a vehicle control device uses only the reliability of the road information output from each sensor to change the ratio of adoption of the output information from the sensor.

Here, for example at a place such as a fork in the road where a lane branches off in a plurality of directions, one sensor may output information indicating that a branch lane has higher reliability, and another sensor may output information indicating that the lane that is not a branch lane (i.e., the original lane before branching) has higher reliability. In such a case, vehicle control based on the information may become unstable.

The technique disclosed in the specification of the present application has been made in order to solve the problem as described above, and it is an object of the present invention to provide a path generation device and a vehicle control system that can inhibit the generation of paths that make vehicles unstable.

Means to Solve the Problem

A first aspect of the technique disclosed in the specification of the present application includes a path generator (30) that generates a plurality of paths along which a vehicle is to travel, in accordance with each piece of environment measurement data about a travel environment of the vehicle detected by a plurality of detectors, a reliability setting part (300) that sets, for each of the plurality of paths generated, reliability of the path in itself, the reliability corresponding to a degree to which a variation in the path falls within a predetermined range, and a path-weight setting part (31) that sets a weight of each of the plurality of paths on the basis of the reliability of the path in itself.

Effects of the Invention

The first aspect of the technique disclosed in the specification of the present application includes a path generator (30) that generates a plurality of paths along which a vehicle is to travel, in accordance with each piece of environment measurement data about a travel environment of the vehicle detected by a plurality of detectors, a reliability setting part (300) that sets, for each of the plurality of paths generated, reliability of the path in itself, the reliability corresponding to a degree to which a variation in the path falls within a predetermined range, and a path-weight setting part (31) that sets a weight of each of the plurality of paths on the basis of the reliability of the path in itself. This configuration can inhibit the generation of paths that make vehicles unstable, by setting the weight of each path on the basis of the degree to which a variation in the road falls within a predetermined range.

The object, features, aspects, and advantages relating to the technique disclosed in the specification of the present application will become more apparent from the following detailed description and the accompanying drawings.

BRIEF DESCRIPTION OF DRAWINGS

FIG. 12 is a diagram for describing processing that is performed depending on the reliability of a path in itself and a condition as to whether a threshold value corresponding to the reliability is satisfied.

FIG. 20 is a functional block diagram of the vehicle steering system according to the embodiment.

DESCRIPTION OF EMBODIMENTS

Embodiments will be described hereinafter with reference to the accompanied drawings.

Note that the drawings are given in schematic form, and for convenience in description, configurations may be omitted or simplified appropriately. Mutual relationships in size and position among configurations or the like illustrated in different drawings are not always accurate and can be appropriately changed. To facilitate understanding of the contents of embodiments, hatching may also be given to drawings other than sectional views, such as plan views.

In the following description, similar constituent elements are illustrated with the same reference signs, and they are assumed to have the same names and the same functions. Thus, detailed description of such constituent elements may be omitted in some cases in order to avoid redundant descriptions.

In the following description, terms that mean specific positions and directions, such as "upper," "lower," "left," "right," "side," "bottom," "front," and "back," may be used in some cases, but these terms are merely used for the sake of convenience to facilitate understanding of the content of embodiments and may not relate to directions at the time of actual implementation.

In the following description, ordinal numbers such as "first" and "second" may be used in some cases, but these terms are merely used for the sake of convenience to facilitate understanding of the content of embodiments and are not intended to limit a sequence or the like indicated by the ordinal numbers.

First Embodiment

A vehicle steering system that includes a path generation device and a vehicle control system according to the present embodiment will be described hereinafter.

Configuration of Path Generation Device

Figure 1:
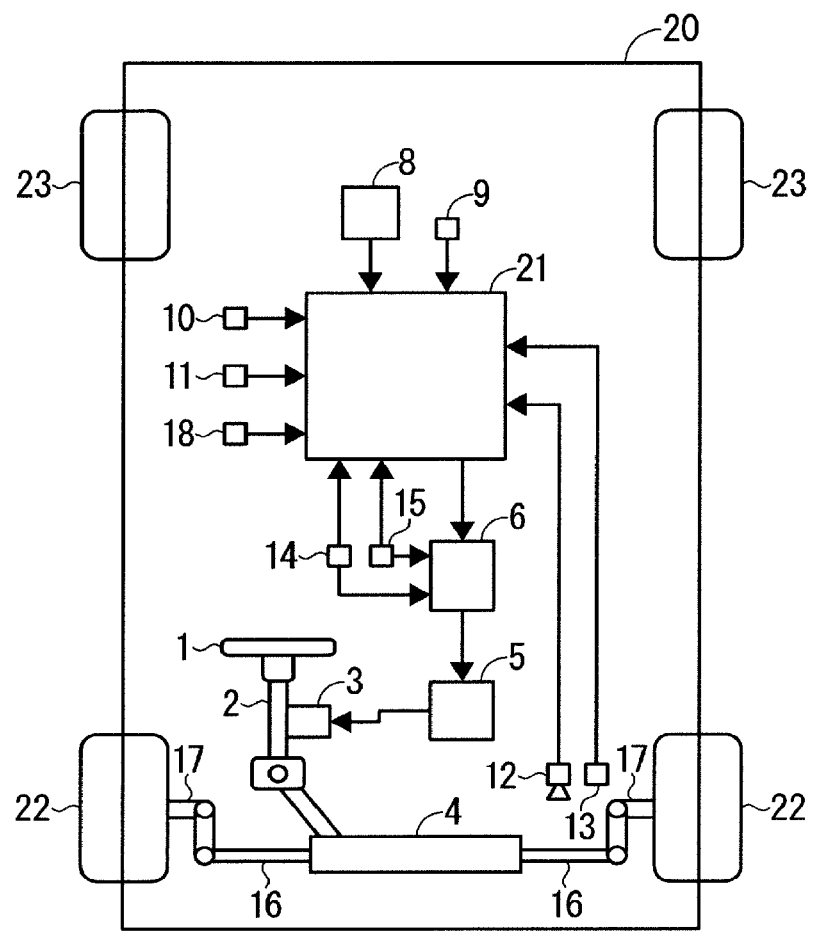
FIG. 1 is a diagram for describing a configuration example of a vehicle steering system according to an embodiment.

FIG. 1 is a diagram for describing a configuration example of a vehicle steering system according to the present embodiment. As illustrated in the example in FIG. 1, a steering wheel 1 that is mounted to enable a driver (i.e., operator) to operate a real vehicle 20 is coupled to a steering shaft 2. The steering shaft 2 is engaged with a pinion shaft and forms a rack-and-pinion mechanism 4 that moves to and fro freely.

Front knuckles 17 are provided via tie rods 16 in connection with the right and left sides of a rack shaft of the rack-and-pinion mechanism 4. The front knuckles 17 respectively support front wheels 22, which serve as steering wheels, so as to make the front wheels 22 free to rotate, and are also supported by a body frame so as to be steered freely.

Thus, a torque generated by the driver operating the steering wheel 1 causes the steering shaft 2 to rotate. Then, the rack shaft is moved in the left-right direction by the rack-and-pinion mechanism 4. The movement of the rack shaft causes the front knuckles 17 to rotate about kingpin shafts (not shown) and thereby allows the front wheels 22 to be steered in the left-right direction.

In this way, the driver is able to manipulate the amount of lateral travel of the vehicle when the vehicle moves forward or backward. Note that it is also possible to use an electric motor 3 to rotate the steering shaft 2, and as a result of the electric motor 3 being driven with the current from a motor drive 5, the front wheels 22 can be freely steered independently of the driver's operation of the steering wheel 1.

The motor drive 5 is a device for controlling the current flowing through the electric motor 3, using as a target value a current command value received from a steering control device 6.

The steering control device 6 has a function of converting information regarding a target steering amount output from a vehicle control system 21 into a current command value that is output to the motor drive 5.

The steering control device 6 is connected to a steering angle sensor 14 and a steering torque sensor 15. The steering control device 6 performs feedback control of a steering angle δ and a steering torque Td to determine the current command value that is output to the motor drive 5, the steering angle δ being detected by the steering angle sensor 14 and output to the steering control device 6, and the steering torque Td being detected by the steering torque sensor 15 and output to the steering control device 6.

The vehicle control system 21 has a function of determining a target steering amount that is output to the steering control device 6. The vehicle control system 21 is connected to a speed sensor 10, a gyroscopic sensor 11, the steering angle sensor 14, the steering torque sensor 15, an acceleration sensor 18, a forward camera 12, a forward radar 13, a GNSS sensor 9, and a navigation device 8.

The steering control device 6 and the vehicle control system 21 correspond to processing circuits. The processing circuits may be configured to execute programs stored in, for example, a storage device, an external CD-ROM, an external DVD-ROM, or an external flash memory.

That is, the processing circuits may, for example, be central processing units (i.e., CPUs), microprocessors, microcomputers, or digital signal processors (i.e., DSPs).

Here, the storage device may, for example, be a hard disk drive (i.e., HDD), a volatile or non-volatile semiconductor memory such as a random access memory (i.e., RAM), a read-only memory (i.e., ROM), a flash memory, an erasable programmable read-only memory (EPROM), or an electrically erasable programmable read-only memory (EEPROM), a memory (storage medium) including, for example, a magnetic disc, a flexible disc, an optical disc, a compact disc, a minidisc, or a DVD, or any other possible storage medium that may be used in the future.

In the case where the processing circuits are configured to execute programs stored in, for example, a storage device, an external CD-ROM, an external DVD-ROM, or an external flash memory, the steering control device 6 and the vehicle control system 21 are embodied by software, firmware, or a combination of software and firmware in which the programs stored in the storage device are executed by the processing circuits. Note that the functions of the steering control device 6 and the vehicle control system 21 may be embodied by, for example, the cooperation of a plurality of processing circuits.

Software and firmware may be described as programs and stored in the storage device. In that case, the processing circuits achieve the above-described functions by reading out and executing the programs stored in the storage device. That is, the storage device may be configured to store programs that consequently achieve the above-described functions by being executed by the processing circuits.

As another alternative, the processing circuits corresponding to the steering control device 6 and the vehicle control system 21 may be dedicated hardware. That is, the processing circuits may, for example, be single circuits, composite circuits, programmed processors, parallel-programmed processors, application-specific integrated circuits (i.e., ASICs), field-programmable gate arrays (FPGAs), or a combination of these circuits.

The speed sensor 10 has a function of converting the outputs of speed pulse sensors (not shown) into a vehicle speed V of the vehicle, the speed pulse sensors being respectively mounted on the front wheels 22 and the rear wheels 23 and detecting the amounts of rotation of the wheels.

The gyroscopic sensor 11 detects a yaw rate y of the vehicle. The acceleration sensor 18 detects the acceleration of the vehicle.

The navigation device 8 guides the driver to a destination that has been set by the driver.

The GNSS sensor 9 receives radio waves transmitted from positioning satellites with its antenna and outputs an absolute position (i.e., latitude, longitude, and altitude) and an absolute orientation of the vehicle, and reliability Rsg of the absolute position and the absolute orientation through positioning computations.

In general, the GNSS sensor has a function of outputting positioning quality in a positioning mode or dulation of precision (DOP), the DOP being the degree of effect of the geometries of satellites on positioning precision. Thus, the reliability of output information is usually computed based on these values.

The navigation device 8 has a function of calculating an optimum travel path leading to the destination set by the driver. The navigation device 8 also records road information as to this travel path.

The road information is map node data that expresses the geometric line form of the road. Each piece of the map node data includes, for example, an absolute position (i.e., latitude, longitude, and altitude), a lane width, and the angle of cant or the angle of tilt at each node.

The forward camera 12 is mounted in a position at which edge lines in front of the vehicle can be detected as an image. The forward camera 12 detects a forward environment of the vehicle, such as a lane, on the basis of information as to this image. Then, the forward camera 12 outputs a result obtained by approximating a front lane viewed from the vehicle by a polynomial or a spline curve, and reliability Rsc of the approximation result.

The forward radar 13 is mounted forward of the vehicle. The forward radar 13 emits radar waves toward the front of the vehicle and detects reflected waves of the radar waves so as to output the relative distance and speed of the vehicle with respect to the preceding vehicle that is travelling in front of the vehicle. The forward radar 13 also outputs reliabilities Rsr of these pieces of information in consideration of circumstances under which the preceding vehicle is captured.

As will be described later, with combined use of the GNSS sensor 9, the navigation device 8, the forward camera 12, and the forward radar 13, each sensor can generate a path along which the vehicle is to travel.

Figure 2:
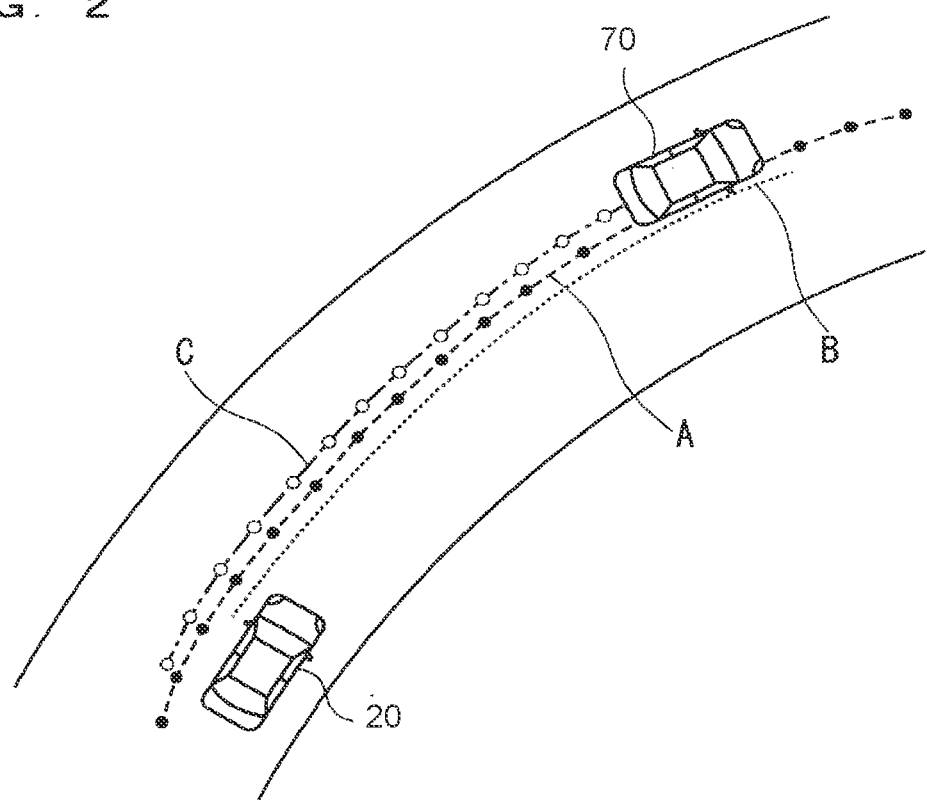
FIG. 2 schematically illustrates a path generated based on information output from a forward camera, a path generated based on information output from a GNSS sensor, and a path generated based on information output from a forward radar.

FIG. 2 schematically illustrates a path B generated based on the information output from the forward camera 12, a path A generated based on the information output from the GNSS sensor 9, and a path C generated based on the information output from the forward radar 13. In FIG. 2, the path A is generated by connecting map nodes indicated by black dots. The path C is generated by connecting nodes of the preceding vehicle indicated by white dots.

In the above example, in the case where the paths A, B, and C have approximately the same degree of reliability, i.e., the paths themselves have high reliabilities of the same degree, no particular problem seems to arise as a result of employing any one of these paths. However, even if one of these paths is employed, path generation may end in failure due to various factors.

In the present embodiment, the reliability of each path in itself (i.e., the degree to which the path is reliable) is expressed numerically.

Figure 3:
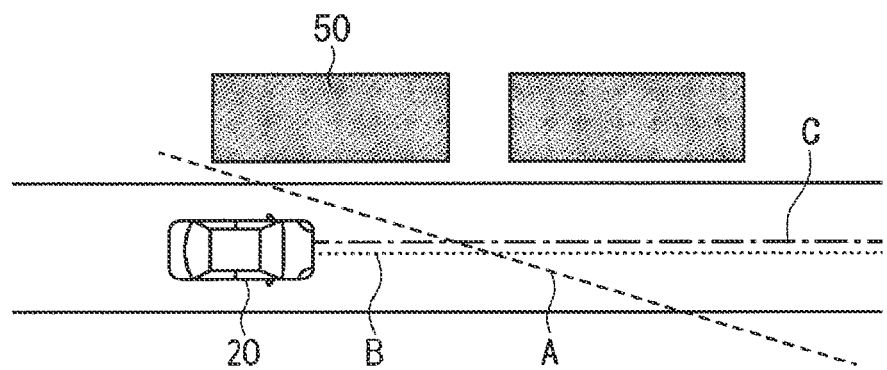
FIG. 3 illustrates an example of the path generated based on the information output from the GNSS sensor.

FIG. 3 illustrates an example of the path generated based on the information output from the GNSS sensor 9. As illustrated as an example in FIG. 3, radio waves from satellites may be disturbed by structures 50, such as buildings in the vicinity of the road, serving as radio shields or radio reflectors. In such a case, path generation may end in failure if the information output from the GNSS sensor is used to generate a path.

Specifically, the path A may become disturbed suddenly as a result of the inability to calculate an accurate position and orientation of the vehicle due to radio waves from satellites being disturbed. That is, the reliability of the path A in itself is reduced.

Figure 4:
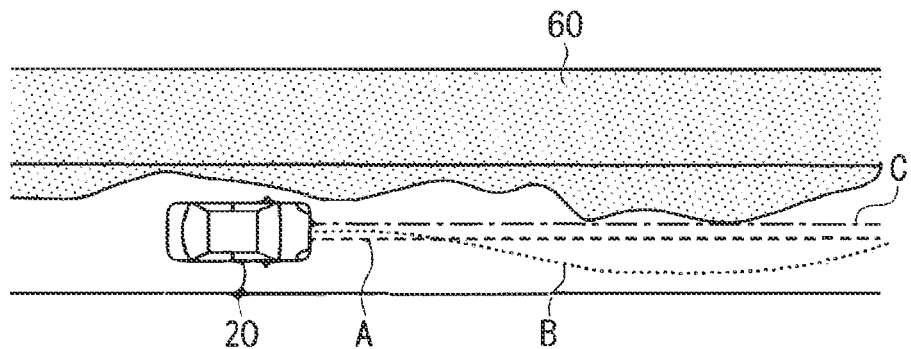
FIG. 4 illustrates an example of the path generated based on the information output from the forward camera.

FIG. 4 illustrates an example of the path generated based on the information output from the forward camera 12. As illustrated as an example in FIG. 4, the presence of an object 60 on a lane, such as accumulated snow or work cones, may cause the forward camera 12 to mistakenly recognize the lane. As a result, the path B may become disturbed suddenly. That is, the reliability of the path B in itself is reduced.

As described above, when a plurality of paths have been generated, adopting any one of the paths may cause unstable behaviors of the vehicle due to low reliability of the path, and as a result, leads to a reduction in the duration of autonomous driving.

In this case, an effective method is to, depending on the reliability of information that is output from each sensor and used to generate a path, change the ratio of adoption of the path generated based on the information.

Figure 5:
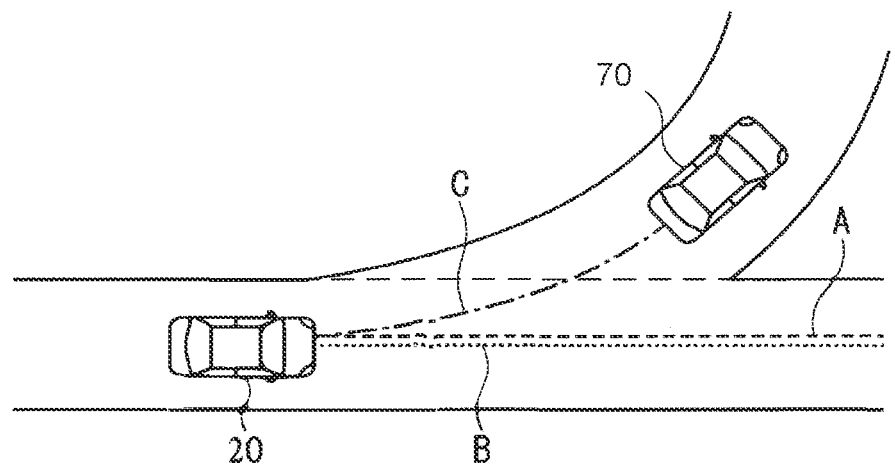
FIG. 5 illustrates an example of paths that are generated when a road branches off.

FIG. 5 illustrates an example of paths generated when a road branches off. As illustrated as an example in FIG. 5, when the road branches off and the preceding vehicle 70 is traveling toward a branch road, the path C is generated so as to be directed toward the branch road.

In this case, if the destination indicated by the navigation device 8 is toward the original road before branching, the path A based on the GNSS sensor 9 is generated to be directed toward the original road before branching, and is thus directed in a direction different from the direction of the path C.

In the case where both of the paths A and C are based on information with high reliability, the ratio of adoption of each path is approximately the same. If the ratios of adoption of the paths A and C directed in different directions are made approximately the same, the operations of the vehicle may become unstable and can cause accidents.

In view of this, the present embodiment describes a technique in which an ultimate path along which the vehicle is to travel is determined in consideration of the reliabilities of a plurality of paths in themselves, including the direction (i.e., travel direction) of each path, instead of a technique in which the ratio of adoption of each path is determined directly from the reliability of information output from each sensor.

Figure 6:
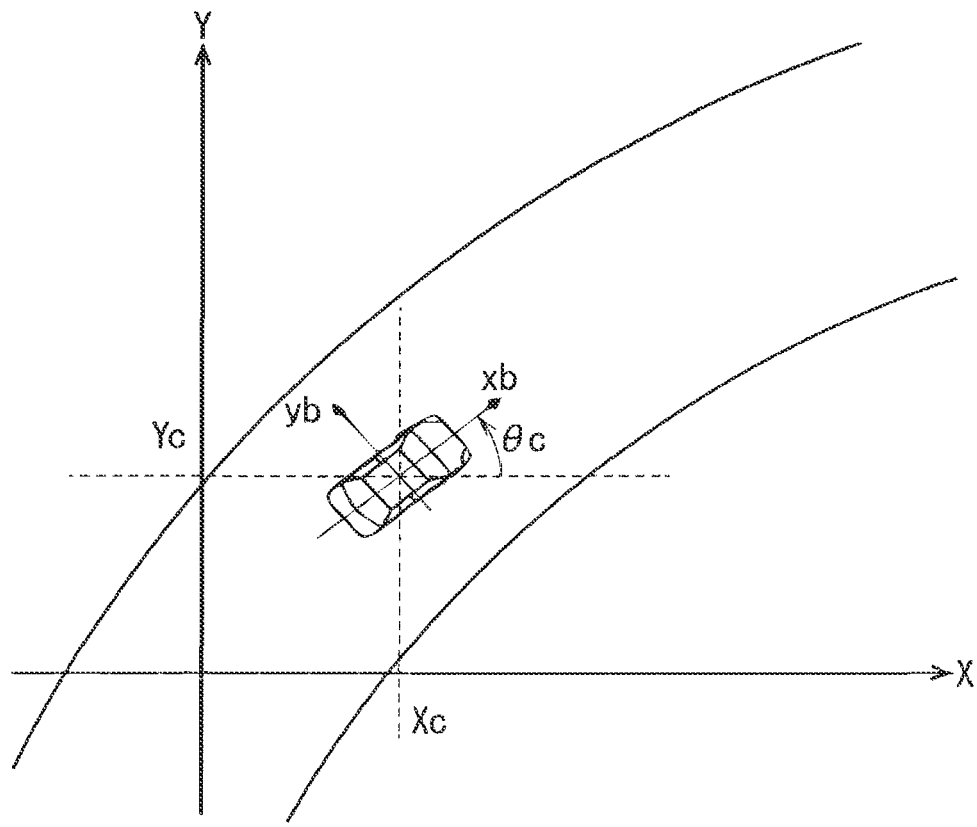
FIG. 6 schematically illustrates a coordinate system used in the embodiment.

FIG. 6 schematically illustrates a coordinate system used in the present embodiment. As illustrated in FIG. 6, X and Y represent an inertial coordinate system, in which Xc and Yc each indicate the position of the vehicle in the inertial coordinate system, and θc indicates the orientation of the vehicle in the inertial coordinate system. In FIG. 6, xb and yb form a vehicle coordinate system, with the gravitational center of the vehicle as an origin, the forward direction of the vehicle as the xb axis, and the left-hand direction as the yb axis.

Figure 7:
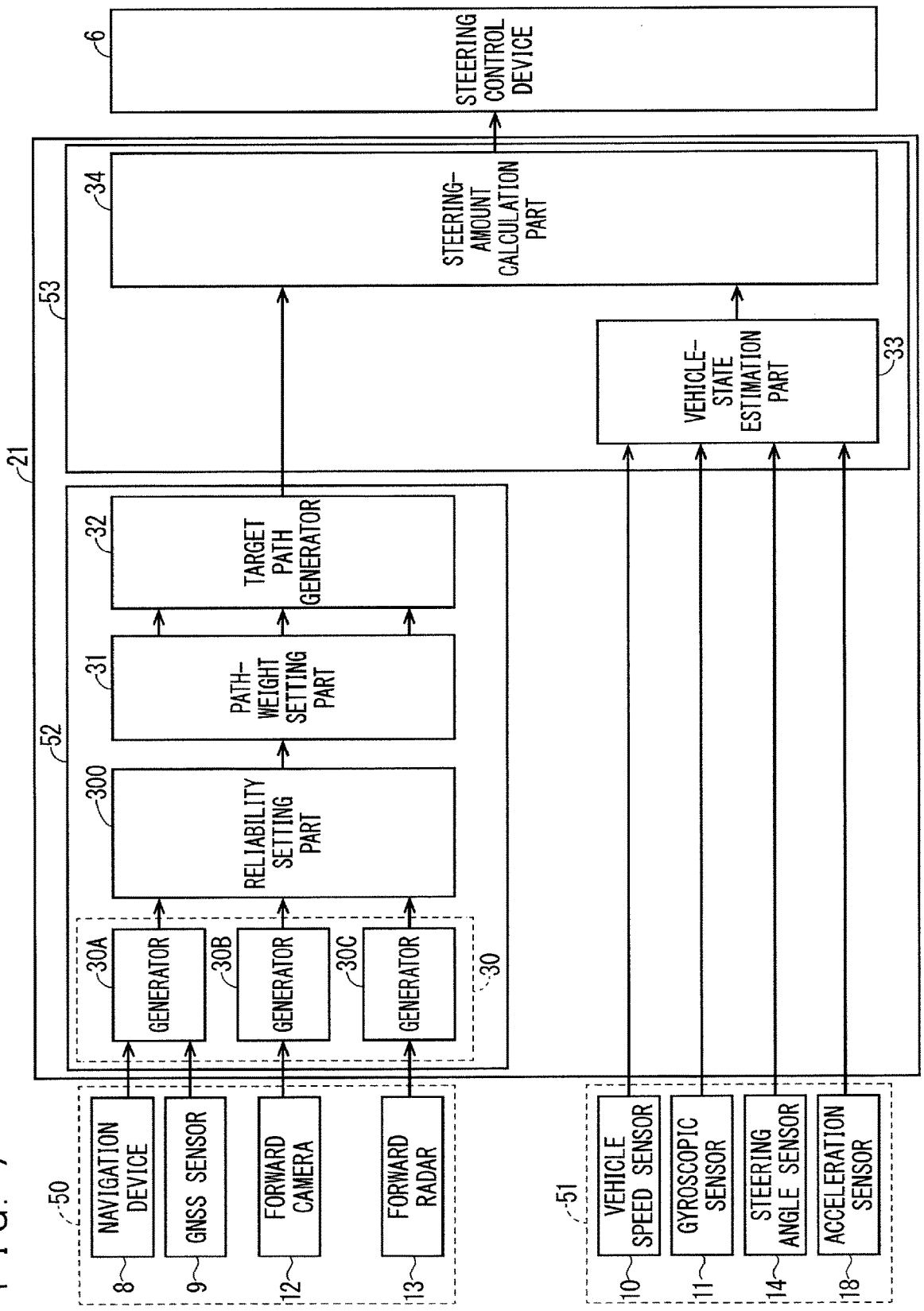
FIG. 7 is a functional block diagram of the vehicle steering system according to the embodiment.

FIG. 7 is a functional block diagram of the vehicle steering system according to the present embodiment. As illustrated as an example in FIG. 7, the vehicle steering system includes a travel environment detector 50, a vehicle state detector 51, a vehicle control system 21 that receives input of outputs from the travel environment detector 50 and the vehicle state detector 51, and a steering control device 6 that receives input of an output from the vehicle control system 21.

The travel environment detector 50 includes the navigation device 8, the GNSS sensor 9, the forward camera 12, and the forward radar 13. The travel environment detector 50 is a functional part that includes a sensor group necessary to generate paths.

The vehicle state detector 51 includes the speed sensor 10, the gyroscopic sensor 11, the steering angle sensor 14, and the acceleration sensor 18. The vehicle state detector 51 is a functional part that includes a sensor group necessary to detect the travel state of the vehicle.

The vehicle control system 21 includes a path generation device 52 and a vehicle control device 53. The path generation device 52 includes a path generator 30, a reliability setting part 300, a path-weight setting part 31, and a target path generator 32. The vehicle control device 53 includes a vehicle-state estimation part 33 and a steering-amount calculation part 34.

The path generation device 52 is a device that generates paths necessary for vehicle control, and functions independently when performing the above operation, for example even if not installed together with the vehicle control device 53. The path generation device 52 calculates a single target path along which the vehicle is to travel, and transfers information as to this path to the vehicle control device 53.

The path generator 30 in the path generation device 52 is a functional part that generates paths, using information output from each sensor in the travel environment detector 50. FIG. 7 schematically illustrates a generator 30A that generates a path, using the information output from the GNSS sensor 9, a generator 30B that generates a path, using the information output from the forward camera 12, and a generator 30C that generates a path, using the information output from the forward radar 13.

The reliability setting part 300 in the path generation device 52 sets the reliability of each path in itself generated by the path generator 30.

The path-weight setting part 31 in the path generation device 52 sets the weight of each path in consideration of a plurality of paths generated by the path generator 30 and the reliabilities of these paths in themselves. Here, the weight of a path refers to a value corresponding to the priority of the path, and the priority of the path becomes higher as the weight of the path increases.

The target path generator 32 in the path generation device 52 generates a single target path, using the plurality of paths generated by the path generator 30 and the weight of each path set by the path-weight setting part 31.

The vehicle control device 53 calculates a target steering angle, using information as to the single target path output from the path generation device 52 and the information (i.e., travel state data) output from each sensor in the vehicle state detector 51, and outputs the target steering angle to the steering control device 6.

Specifically, firstly, the vehicle-state estimation part 33 estimates a vehicle state quantity, using information output from each sensor in the vehicle state detector 51. The vehicle-state estimation part 33 accurately estimates the vehicle state quantity, using the vehicle speed V of the vehicle detected by the speed sensor 10, the yaw rater of the vehicle detected by the gyroscopic sensor 11, the steering angle δ of the vehicle detected by the steering angle sensor 14, and the acceleration a of the vehicle detected by the acceleration sensor 18 while removing noise therefrom. The vehicle state quantity as used herein refers to a quantity that includes the vehicle speed of the vehicle, the yaw rate of the vehicle, the steering angle of the vehicle, and the acceleration of the vehicle. Then, the steering-amount calculation part 34 calculates the target steering amount (target steering angle), using the aforementioned target path information and the vehicle state quantity.

Incidentally, a locator is given as an example of the device for generating paths. The locator has a function of calculating a travel path in accordance with the destination of the driver (operator) and a function of estimating the position of the vehicle with high precision with combined use of a GNSS sensor, a gyroscopic sensor, and a speed sensor.

The functions of this locator have been extended in recent years. Specifically, a path based on the GNSS sensor can be generated by recording map node data within the locator. Accordingly, a path generated with combined use of the GNSS sensor and the navigation device, described in the present embodiment, may be the output of the locator.

Operations of Path Generation Device

Figure 8:
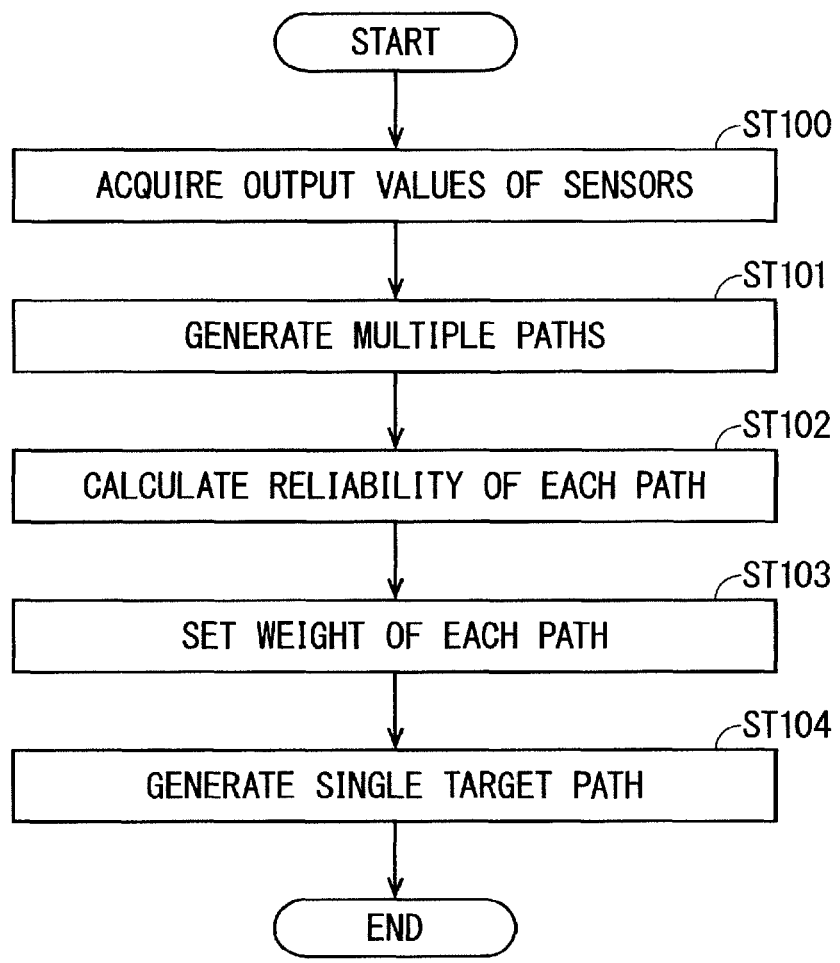
FIG. 8 is a flowchart illustrating a computational procedure used to calculate a target path by a path generation device according to the embodiment.

FIG. 8 is a flowchart illustrating a computational procedure used to calculate a target path by the path generation device 52 according to the present embodiment. With reference to this flowchart, a technique for generating a target path will be described hereinafter.

First, in step ST100, the travel environment detector 50 acquires the output value of each sensor.

Next, in step ST101, the path generation device 52 generates a plurality of paths, using the output value of each sensor obtained by the travel environment detector 50.

Specifically, the generator 30A generates a path, using the output value of the GNSS sensor 9. The generator 30B generates a path, using the output value of the forward camera 12. The generator 30C generates a path, using the output value of the forward radar 13.

The following description is given of a technique for generating paths, using the output values of the sensors in the travel environment detector 50.

Path Based on Output Value of GNSS Sensor 9

Figure 9:
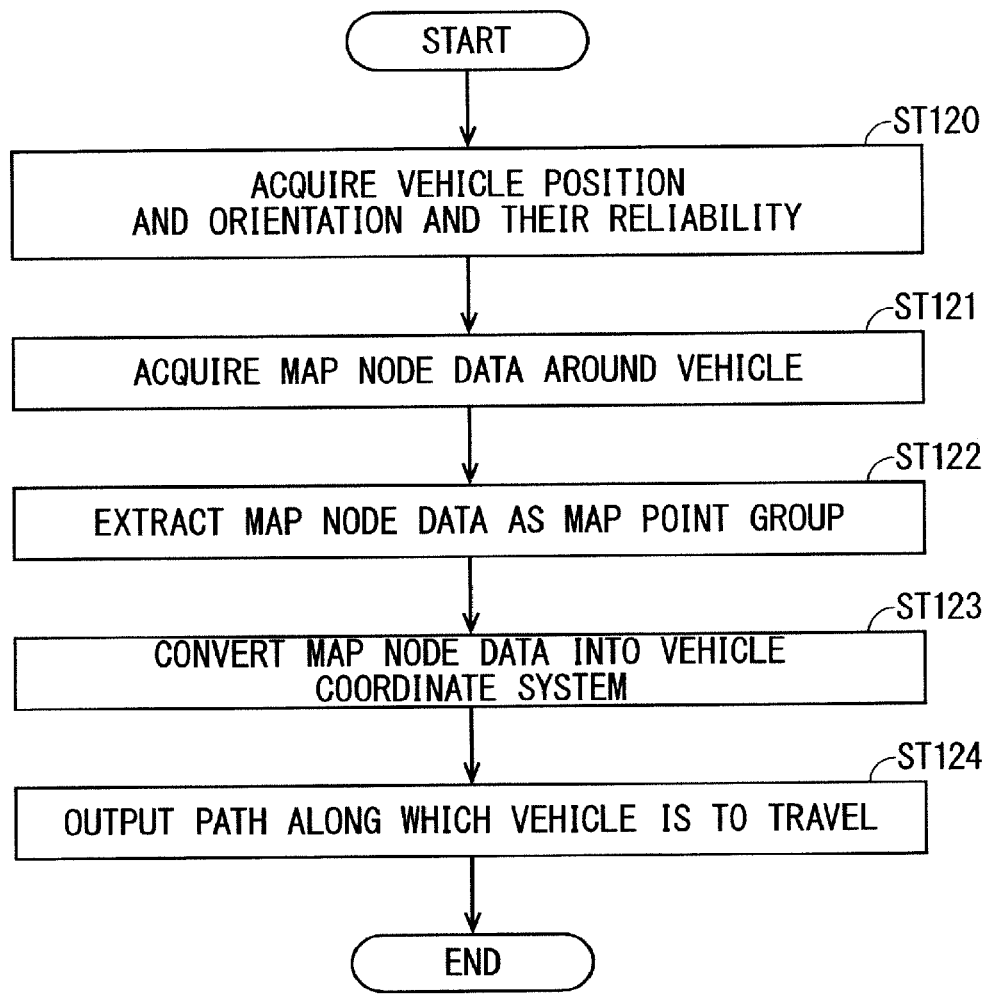
FIG. 9 is a flowchart illustrating a technique for generating a path along which the vehicle is to travel, with combined use of a navigation device and the GNSS sensor.

FIG. 9 is a flowchart illustrating a technique for generating a path along which the vehicle is to travel (hereinafter, also abbreviated as a "path based on the GNSS sensor 9"), with combined use of the navigation device 8 and the GNSS sensor 9.

First, in step ST120, the path generation device 52 acquires the position and orientation of the vehicle and reliability Rsg of the position and orientation from the output value of the GNSS sensor 9. Here, the reliability Rsg represents the precision of positioning estimation obtained in the estimation process during the positioning operation.

Next, in step ST121, the path generation device 52 obtains map node data in the vicinity of the vehicle through matching between the position of the vehicle, i.e., information as to the absolute position of the vehicle obtained in step ST120, and the road information recorded on the navigation device 8.

Next, in step ST122, the path generation device 52 extracts Ng pieces of the map node data obtained in step ST121 as a map point group.

Next, in step ST123, the path generation device 52 converts the map node data obtained in step ST122 into a vehicle coordinate system, using the orientation of the vehicle obtained in step ST120.

Next, in step ST124, the path generation device 52 outputs a path (i.e., the center of a lane) along which the vehicle is to travel by approximating the map point group by a polynomial or a spline curve.

In the present embodiment, the path obtained in step ST124 is assumed to be expressed by a cubic polynomial, and for example, the values of Cg0, Cg1, Cg2, and Cg3 in Expression 1 below are output as a path (i.e., the center of a lane) along which the vehicle is to travel.

$$yb = Cg3 \cdot xb^3 + Cg2 \cdot xb^2 + Cg1 \cdot xb + Cg0 \quad \text{(Expression 1)}$$

Path Based on Output Value of Forward Camera 12

Edge lines viewed from the forward camera 12 on the right and left sides of the vehicle are expressed by parameters of a cubic curve and output from the path generation device 52.

Here, information as to the right edge line is expressed by Expression 2 below, and the values of Ccr0, Ccr1, Ccr2, and Ccr3 in Expression 2 below are output from the path generation device 52.

$$yb = Ccr3 \cdot xb^3 + Ccr2 \cdot xb^2 + Ccr1 \cdot xb + Ccr0 \quad \text{(Expression 2)}$$

Information as to the left edge line is expressed by Expression 3 below, and the values of Ccl0, Ccl1, Ccl2, and Ccl3 in Expression 3 below are output from the path generation device 52.

$$yb = Ccl3 \cdot xb^3 + Ccl2 \cdot xb^2 + Ccl1 \cdot xb + Ccl0 \quad \text{(Expression 3)}$$

In this case, the path (i.e., the center of the lane) along which the vehicle is to travel is expressed by Expression 4 below.

$$yb = Cc3 \cdot xb^3 + Cc2 \cdot xb^2 + Cc1 \cdot xb + Cc0 \quad \text{(Expression 4)}$$

Here, Cc0, Cc1, Cc2, and Cc3 satisfy the following relationships:

$$Cc3 = (Ccr3 + Ccl3)/2$$

$$Cc2 = (Ccr2 + Ccl3)/2$$

$$Cc1 = (Ccr1 + Ccl1)/2$$

$$Cc0 = (Ccr0 + Ccl0)/2$$

Path Based on Output Value of Forward Radar 13

Figure 10:
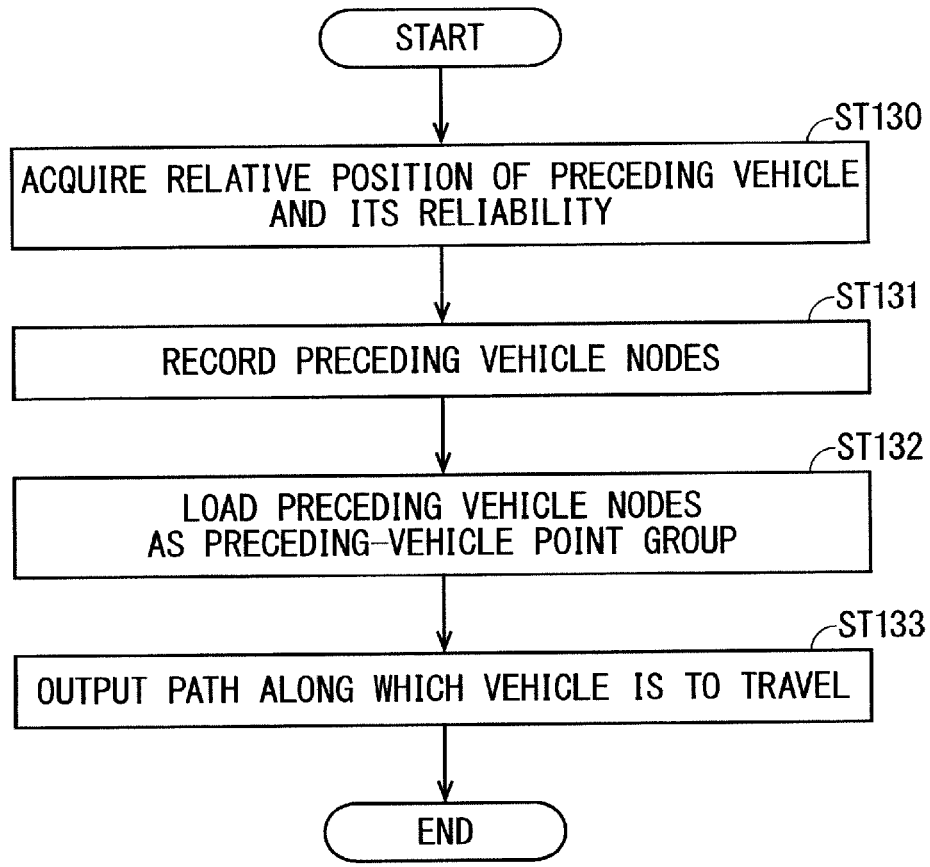
FIG. 10 is a flowchart illustrating a technique for generating a path along which the vehicle is to travel, with use of the forward radar.

FIG. 10 is a flowchart illustrating a technique for generating a path along which the vehicle is to travel, with use of the forward radar 13.

First, in step ST130, the path generation device 52 acquires a relative position (relative distance) of the preceding vehicle with respect to the vehicle as a preceding vehicle node from the output value of the forward radar 13. The path generation device 52 also acquires reliability Rsr of the relative distance.

Next, in step ST131, the path generation device 52 records the preceding vehicle node obtained in step ST130 on a preceding-vehicle-node storage device.

Next, in step ST132, the path generation device 52 loads the past Nr preceding vehicle nodes as a preceding-vehicle point group from the preceding-vehicle-node recording device.

Next, in step ST133, the path generation device 52 outputs a path along which the vehicle is to travel (i.e., a path that the preceding vehicle has passed through) by approximating the preceding-vehicle point group loaded in step ST132 by a polynomial or a spline curve.

In the present embodiment, the path obtained in step ST130 is assumed to be expressed by a cubic polynomial, and for example, the values of Cr0, Cr1, Cr2, and Cr3 in Expression 5 below are output as the path along which the vehicle is to travel (i.e., the path that the preceding vehicle has passed through).

$$yb = Cr3 \cdot xb^3 + Cr2 \cdot xb^2 + Cr1 \cdot xb + Cr0 \quad \text{(Expression 5)}$$

Figure 11:
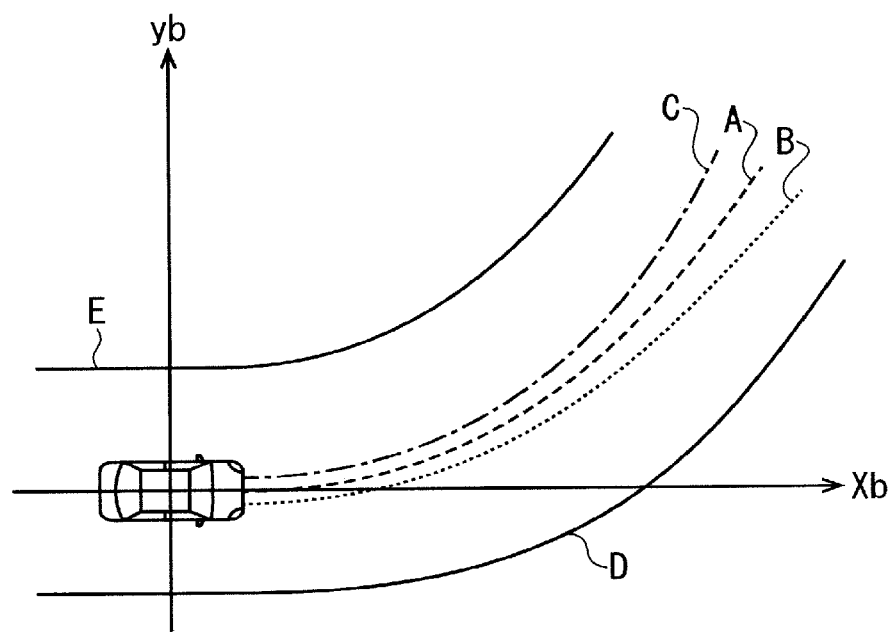
FIG. 11 is a schematic diagram illustrating the case where a plurality of paths is expressed in a vehicle coordinate system.

FIG. 11 is a schematic diagram illustrating the case where the plurality of paths is expressed in the vehicle coordinate system. The paths A, B, and C in FIG. 11 are expressed as a polynomial or a spline curve in the vehicle coordinate system, with the gravitational center of the vehicle as an origin.

With use of the forward camera 12 or combined use of the GNSS sensor 9 and the navigation device 8, a right edge line D and a left edge line E can also be expressed as a polynomial or a spline curve.

Next, in step ST102 in FIG. 8, the reliability of each path in itself generated in step ST101 is calculated. The present embodiment uses the following method as a method for obtaining the reliability of each path in itself.

Here, a path p expressed as a cubic polynomial shall be considered. The path p is assumed to be obtained from Expression 6 below.

$$yb = Cp3 \cdot xb^3 + Cp2 \cdot xb^2 + Cp1 \cdot xb + Cp0 \quad \text{(Expression 6)}$$

One method for obtaining reliability Rp of the path p is to directly use the reliability Rs output from each sensor in generating the path. That is, the relationship between the reliability Rp of the path p and the reliability Rs output from each sensor is expressed as follows:

$$Rp = Rs$$

As another method used to obtain the reliability Rp of the path p by the reliability setting part 300, a method using a rate limiter will be described below.

Route parameters Cp0, Cp1, Cp2, and Cp3 of the route p at the present moment are compared with route parameters of the route p that is generated one generation cycle before. Then, if a variation in any of the route parameters Cp0, Cp1, Cp2, and Cp3 at the present moment is greater than or equal to a threshold value, the reliability of this route parameter is reduced.

Specifically, values of path parameters generated one generation cycle before the path parameters Cp0, Cp1, Cp2, and Cp3 at the present moment are respectively assumed to be Cp0b, Cp1b, Cp2b, and Cp3b.

When the reliabilities of these path parameters are respectively given as Rp0, Rp1, Rp2, and Rp3, the threshold values of the rates of the path parameters are respectively given as $\Delta Cpt0$, $\Delta Cpt1$, $\Delta Cpt2$, and $\Delta Cpt3$, and adjusted parameters are respectively given as $\alpha 0$, $\alpha 1$, $\alpha 2$, and $\alpha 3$, the reliabilities Rp0, Rp1, Rp2, and Rp3 of the path parameters are set as follows:

$$R_{pi} = \begin{cases} 0 & \text{if } |C_{pi} - C_{pib}| \leq \Delta C_{pti} \\ e^{\alpha_i \cdot (C_{pi} - C_{pib})^2} & \text{else} \end{cases} \quad i = 0, \ldots, 3$$

Using the reliabilities Rp0, Rp1, Rp2, and Rp3 of the path parameters, the reliability of the path p in itself is set as expressed by Expression 7 below.

$$Rp = Rp0 \cdot Rp1 \cdot Rp2 \cdot Rp3 \quad \text{(Expression 7)}$$

Next, another method used to obtain the reliability of the path p in itself by the reliability setting part 300 will be described. More specifically, a method is described in which possible ranges of values for the path parameters Cp0, Cp1, Cp2, and Cp3, each expressing a path, are set in advance, and if any of the path parameters falls outside this range, the reliability of this path in itself is reduced.

First, a geometric line form of the road on which the vehicle is to travel is estimated. The settings as used herein are such that the vehicle travels along the road as follows.

More specifically, assuming that the vehicle travels along a half width of the road width and if a minimum value Lpmin is set to 1.4 m and a maximum value Lpmax is set to 1.8 m, the range of Cp0 is determined to be greater than or equal to 1.4 m and less than or equal to 1.8 m according to Expression 6. As a function used to obtain the reliability Rp0 of the Cp0 term, the following expression can be used.

$$R_0 = \begin{cases} 0 & \text{if } C_{p0} \leq \Delta L_{pmin} \\ e^{-\alpha_0 \cdot C_{p0}^2} & \text{if } L_{pmin} \leq C_{p0} \leq \Delta L_{pmax} \\ 0 & \text{if } C_{p0} \geq \Delta L_{pmax} \end{cases}$$

By using this function, the reliability Rp0 is obtained.

If a minimum value $\theta pmin$ of the azimuth angle of the vehicle relative to the road is set to −1 rad and a maximum value $\theta pmax$ thereof is set to 1 rad, an orientation $\theta p$ of the path p in xb is expressed by Expression 8 below.

$$\theta p = \tan^{-1}(Cp1) \quad \text{(Expression 8)}$$

Accordingly, the range of Cp1 is determined to be in the range of tan(−1) to tan(1). As a function used to obtain the reliability Rp1 of the Cp1 term, the following expression can be used.

$$R_{p1} = \begin{cases} 0 & \text{if } C_{p1} \leq \tan(\theta_{pmin}) \\ e^{-\alpha_1 \cdot C_{p2}^2} & \text{if } \tan(\theta_{pmin}) \leq C_{p1} \leq \tan(\theta_{pmax}) \\ 0 & \text{if } C_{p1} \geq \tan(\theta_{pmax}) \end{cases}$$

By using this function, the reliability Rp1 is obtained.

If a minimum value κcmin of the curvature of the road is set to 0[1/m] and a maximum value κcmax thereof is set to 0.02[1/m], the curvature κp of the path p is expressed by Expression 9 below.

$$\kappa p = 2 \cdot Cp2 \quad \text{(Expression 9)}$$

Accordingly, the range of Cp2 is determined to be greater than or equal to 0[1/m] and less than or equal to 0.02[1/m]. As a function used to obtain the reliability Rp2 of the Cp2 term, the following expression can be used.

$$R_{p2} = \begin{cases} 0 & \text{if } 2 \cdot C_{p2} \leq \kappa_{min} \\ e^{-\alpha_2 \cdot C_{p3}^2} & \text{if } \kappa_{min} \leq 2 \cdot C_{p2} \leq \kappa_{max} \\ 0 & \text{if } 2 \cdot C_{p2} \geq \kappa_{max} \end{cases}$$

Finally, the reliability Rp of the path p in itself is obtained as follows:

$$Rp = Rp0 \cdot Rp1 \cdot Rp2 \quad \text{(Expression 10)}$$

The reliability setting part 300 sets the reliability Rp of each path in itself by using one of the above-described methods.

Next, in step ST103 in FIG. 8, the path-weight setting part 31 sets the weight of each of the paths generated by the path generator 30.

In the present embodiment, the paths obtained by the path generator 30 are assumed to be expressed as cubic polynomials. That is, the path based on the GNSS sensor 9 is expressed by Expression 1, the path based on the forward camera 12 is expressed by Expression 4, and the path based on the forward radar 13 is expressed by Expression 5.

It is also assumed that the right and left edge lines viewed from the vehicle are obtained in the form of cubic polynomials, using the GNSS sensor 9 or the map node data recorded on the navigation device 8 or through edge-line detection using the forward camera 12. That is, the right edge line is assumed to be expressed by Expression 2, and the left edge line is assumed to be expressed by Expression 3.

The following description is given of a method used by the path-weight setting part 31 to determine the weight of each path depending on situations based on the reliability of the path in itself.

First, threshold values for the plurality of paths are set. In the present embodiment, a threshold value for the reliability Rg of the path based on the GNSS sensor 9 in itself is given as Thg, a threshold value for the reliability Rc of the path based on the forward camera 12 in itself is given as Thc, and a threshold value for the reliability Rr of the path based on the forward radar 13 in itself is given as Thr.

FIG. 12 is a diagram for describing processing that is performed depending on the reliability of each path in itself and a condition as to whether the threshold value corresponding to the reliability is satisfied or not.

The path based on the GNSS sensor 9 is most appropriate as a reference path because this path is generated in consideration of the travel path. Thus, in the example illustrated in FIG. 12, a lane deviation determination for the path based on the GNSS sensor 9 is given higher priority than that for the path based on the forward camera 12 or the path based on the forward radar 13.

In the lane deviation determination using the GNSS sensor 9 and the navigation device 8, the path of the right edge line and the path of the left edge line (hereinafter, also abbreviated as the "edge lines based on the GNSS sensor") are estimated, using the vehicle position obtained by the GNSS sensor 9 and the map node data recorded on the navigation device 8.

For the path p that has undergone other threshold-value determinations, excluding that for the path based on the GNSS sensor 9, it is determined whether the path p goes out of the edge lines based on the GNSS sensor 9.

As a determination method, there is a method in which, using a point $L_t$ (>0) on a predetermined xb axis that is set in advance, it is determined whether the path based on the GNSS sensor 9 and the path p have an intersection within a range greater than or equal to 0 and less than or equal to $L_t$.

As another determination method, there is a method in which $L_t$ is divided into $N_t$ segments, and a comparison is made among ybp, ybl, and ybr, where ybp is the value of yb on the path p for each segment width ht (i.e., ht=Lt/Nt), ybl is the value of yb on the left edge line based on the GNSS sensor 9 for each segment width ht, and ybr is the value of yb on the right edge line based on the GNSS sensor 9 for each segment width ht, and it is determined at each point whether Expression 11 below is satisfied.

$$ybl < ybp < ybr \quad \text{(Expression 11)}$$

If the path p does not satisfy Expression 11, the path p deviates from the edge lines based on the GNSS sensor 9 within the range of $L_t$.

In the case where the path p deviates from the edge lines based on the GNSS sensor 9, the path-weight setting part 31 sets a weight ωp of the path p to zero.

On the other hand, in the case where the path p does not deviate from the edge lines based on the GNSS sensor 9, the path-weight setting part 31 sets a weight ωg of the path based on the GNSS sensor 9 and the weight ωp of the path p as follows, using the reliability Rg of the path based on the GNSS sensor 9 in itself obtained in step ST102, and the reliability Rp of the path p in itself.

$$\omega g = Rg$$

$$\omega p = Rp$$

Next, a lane deviation determination using the forward camera 12 in FIG. 12 will be described. As described previously, the forward camera 12 outputs the paths for the right and left edge lines viewed forward of the vehicle (hereinafter, also abbreviated as "edge lines based on the forward camera").

The processing as performed herein uses the edge lines based on the forward camera 12 and is similar to the processing performed in the lane deviation determination using the GNSS sensor 9 and the navigation device 8. That is, the path-weight setting part 31 determines whether the path p deviates from the edge lines based on the forward camera 12, and sets a weight based on the determination result.

In the case where the reliability of the path based on the GNSS sensor 9 in itself, the reliability of the path based on the forward camera 12 in itself, and the reliability of the path based on the forward radar 13 in itself are all lower than the above-described threshold values, autonomous driving is stopped, considering that autonomous driving is impossible. At this time, authority to drive the vehicle may be delegated to the driver.

The weight setting illustrated in FIG. 12 is performed in the case where the reliability of only one of the plurality of paths is higher than the threshold value. In this case, the path-weight setting part 31 sets the weight of the path p to the reliability of the path in itself obtained in step ST102, and sets the weights ωq of the other paths q to zero. That is, the weights are determined as follows.

$$\omega p = Rp$$

$$\omega q = 0$$

Note that the method of setting the weight of a path described herein may be a method of increasing the weight of a path that the drive wants to select. As one example, in the case where the driver wants to preferentially select the path based on the forward radar 13, the following expressions may be employed, where Rg and ωg are respectively the reliability and weight of the path based on the GNSS sensor 9 in itself, Rc and ωc are respectively the reliability and weight of the path based on the forward camera 12 in itself, and as Rr and ωr are respectively the reliability and weight of the path based on the forward radar 13 in itself.

$$\omega g = 0.2 \cdot Rg$$

$$\omega c = 0.2 \cdot Rc$$

$$\omega r = 1.0 \cdot Rr$$

By so doing, preference is given to the selection of the path based on the forward radar 13.

As another alternative, the weight of each path may be smoothly changed using a low pass filter. In this case, it is possible to achieve the effect of being able to avoid unstable vehicle movements caused by abrupt changes in weight.

Next, in step ST104 in FIG. 8, the target path generator 32 generates a single target path.

In the present embodiment, the operation of the target path generator 32 using weighted averaging will be described.

In the case where the path-weight setting part 31 sets the weight of the path based on the GNSS sensor 9 to ωg, sets the weight of the path based on the forward camera 12 to ωc, and sets the weight of the path based on the forward radar 13 to ωr, a target path obtained by weighted averaging is expressed as follows:

$$yb = Cw3 \cdot xb^3 + Cw2 \cdot xb^2 + Cw1 xb + Cw0$$

First, the following relationship is defined.

$$\omega w = \omega g + \omega r + \omega c$$

Then, Cw0, Cw1, Cw2, and Cw3 can be obtained from the following expressions.

$$Cw3 = (\omega g \cdot Cg3 + \omega c \cdot Cc3 + \omega r \cdot Cr3)/\omega w$$

$$Cw2 = (\omega g \cdot Cg2 + \omega c \cdot Cc2 + \omega r \cdot Cr2)/\omega w$$

$$Cw1 = (\omega g \cdot Cg1 + \omega c \cdot Cc1 + \omega r \cdot Cr1)/\omega w$$

$$Cw0 = (\omega g \cdot Cg0 + \omega c \cdot Cc0 + \omega r \cdot Cr0)/\omega w$$

Through this computational procedure, the path generation device 52 can generate a single path.

Figure 13:
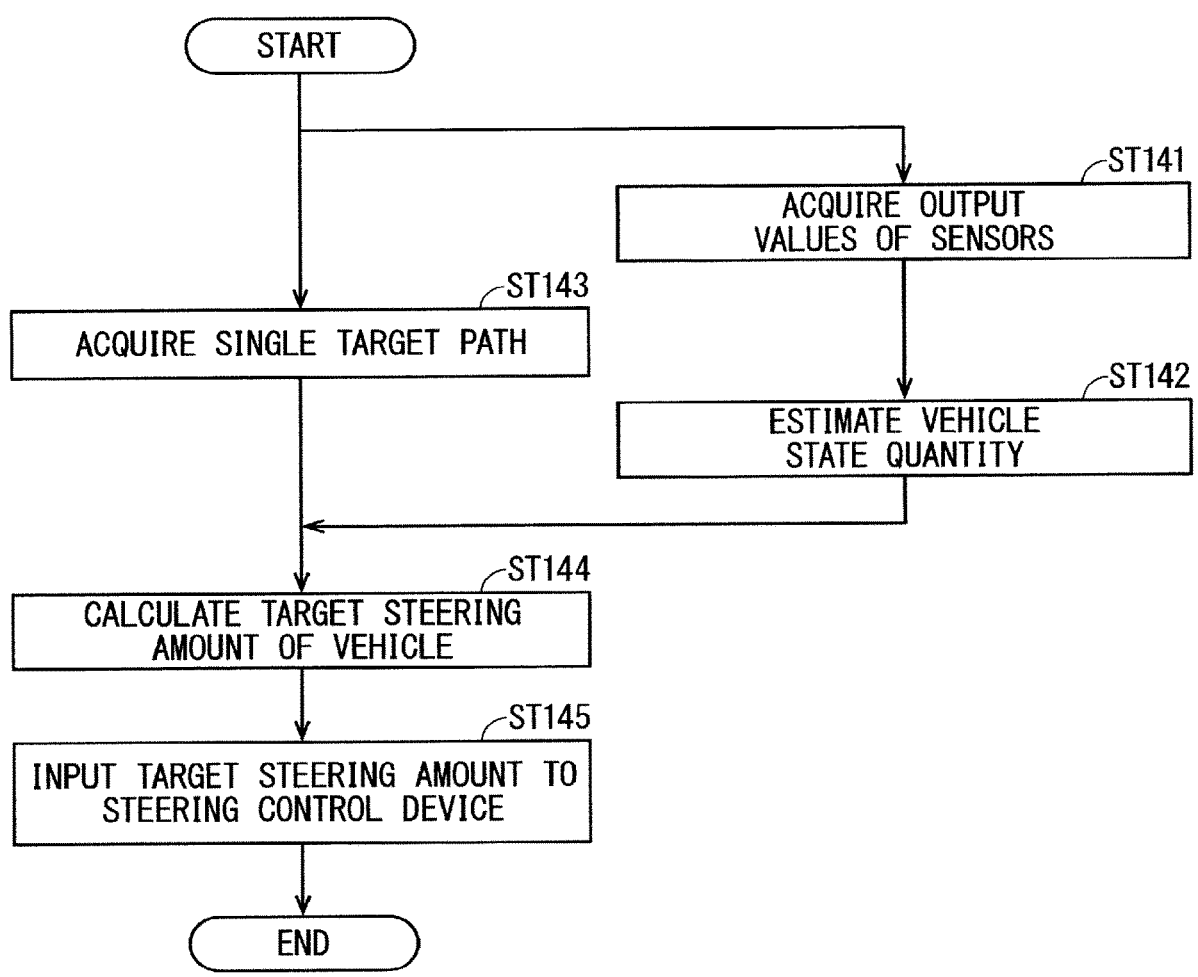
FIG. 13 is a flowchart illustrating a computational procedure used by a steering control system in a vehicle control system.

FIG. 13 is a flowchart illustrating a computational procedure used by a steering control system in the vehicle control system 21. With reference to this flowchart, a technique for calculating a target steering amount will be described hereinafter.

First, in step ST141, the vehicle state detector 51 acquires the output value of each sensor.

Next, in step ST142, the vehicle-state estimation part 33 estimates a vehicle state (specifically, a vehicle state quantity), using the output value of each sensor obtained in step ST141. To estimate the vehicle state quantity, known technology such as a low pass filter, an observer, a Karman filter, or a particulate filter may be used.

Meanwhile, in step ST143, the steering-amount calculation part 34 acquires the single target path output from the path generation device 52.

After both of steps ST142 and ST143, the procedure proceeds to step ST144.

Next, in step ST144, the steering-amount calculation part 34 calculates a target steering amount of the vehicle, using the single target path and the vehicle state quantity.

The following description is given of a method in which the steering-amount calculation part 34 calculates the target steering amount, using the target path generated by the target path generator 32 and the vehicle state quantity estimated by the vehicle-state estimation part 33.

Figure 14:
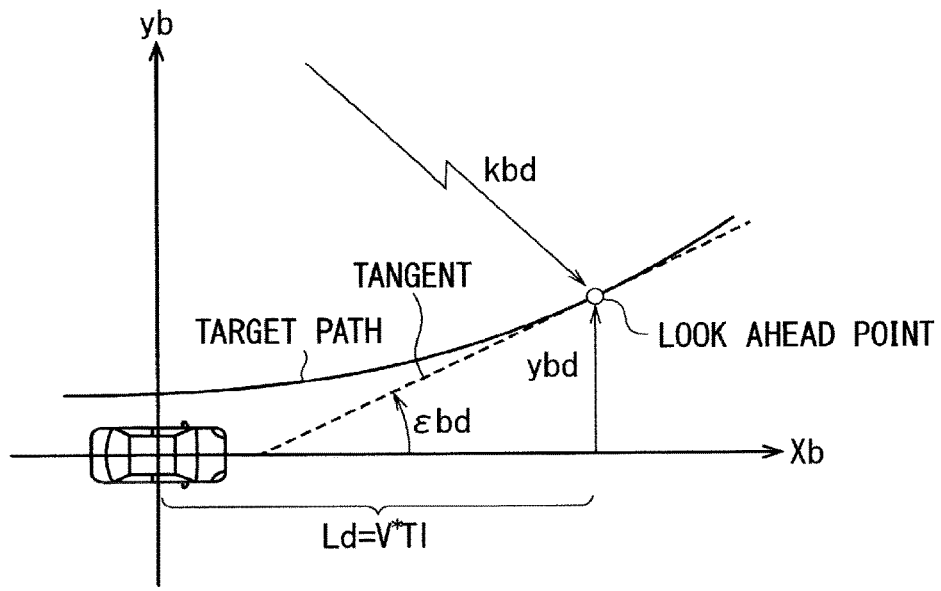
FIG. 14 schematically illustrates parameters used to obtain a target steering amount in the case where a target path is given.

FIG. 14 schematically illustrates parameters used to obtain the target steering amount in the case where a target path is given. In FIG. 14, the gravitational center position of the vehicle corresponds to the origin of the xb and yb axes. The straight dotted line is a tangent to the target path indicated by the solid line at a look ahead point.

First, the look ahead point is set in the path. As a method for setting the look ahead point, the present embodiment sets a forward fixation distance Ld as follows, using the vehicle speed V of the vehicle estimated with high accuracy by the vehicle-state estimation part 33 and a preset fixation time T1 (>0).

$$Ld = V \cdot T1$$

A forward look ahead point (i.e., forward fixation point) is set at the position of the forward fixation distance Ld on the xb axis in the vehicle coordinate system.

Here, the target path is expressed by the following expression.

$$yb = Cw3 \cdot xb^3 + Cw2 \cdot xb^2 + Cw1 \cdot xb + Cw0$$

A lateral deviation ybd at the forward fixation distance Ld is expressed by the following expression.

$$ybd = Cw3 \cdot Ld^3 + Cw2 \cdot Ld^2 + Cw1 \cdot Ld + Cw0$$

The tangent to the target path at the look ahead point is obtained by differentiating the target path with respect to xb and expressed by the following expression.

$$yb' = 3 \cdot Cw3 \cdot xb^2 + 2 \cdot Cw2 \cdot xb + Cw1$$

An angular deviation εbd at the forward fixation distance Ld between the xb axis and the tangent to the target path at the look ahead point is expressed by the following expression.

$$\varepsilon bd = \tan^{-1}(3 \cdot Cw3 \cdot Ld^2 + 2 \cdot Cw2 Ld + Cw1)$$

Moreover, the following expression is obtained by second-order differentiation of the target path with respect to xb.

$$yb'' = 6 \cdot Cw3 \cdot xb + 2 \cdot Cw2$$

Thus, the curvature κbd of the target path at the look ahead point at the forward fixation distance Ld is expressed by the following expression.

$$\kappa bd = 6 \cdot Cw3 \cdot Ld + 2 \cdot Cw2$$

Figure 15:
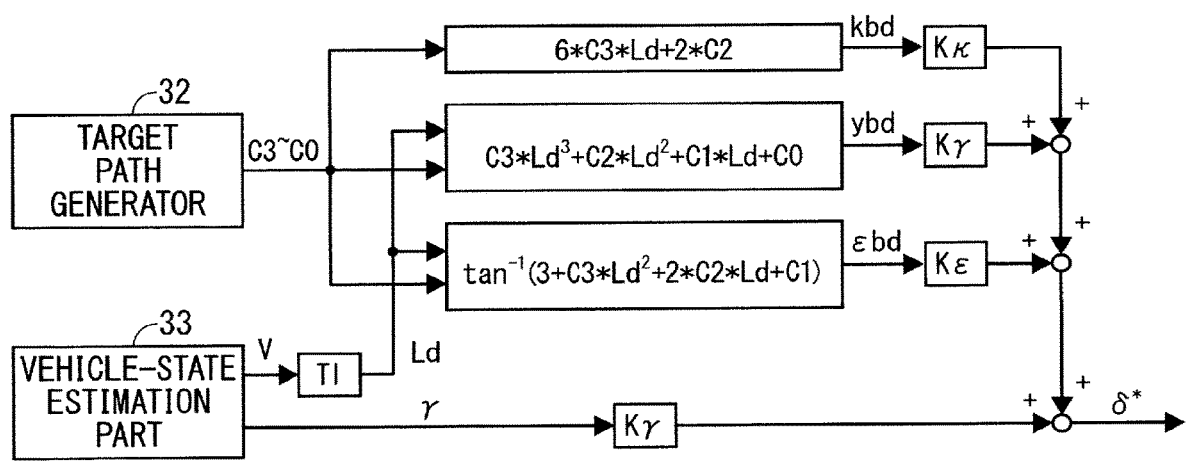
FIG. 15 is a block diagram illustrating a procedure for obtaining a target steering amount δ*.

FIG. 15 is a block diagram illustrating a procedure for obtaining a target steering amount δ*. As illustrated in FIG. 15, the target steering amount δ* is obtained as follows, using the lateral deviation ybd at the look ahead point in the target path and its gain Ky, the angular deviation εbd and its gain Kε, the curvature κbd at the look ahead point and its gain Kκ, and the yaw rate γ obtained by the vehicle-state estimation part 33 and its gain Kγ.

$$\delta^* = Ky \cdot ybd + K\varepsilon \cdot \varepsilon bd + K\kappa \cdot \kappa bd + K\gamma \cdot \gamma$$

Next, in step ST145 in FIG. 13, the target steering amount δ* obtained in step ST144 is input to the steering control device 6 so as to control the vehicle to follow the target path.

In this way, the vehicle control system 21 according to the present embodiment can set the weight of each path on the basis of the reliabilities of a plurality of paths in themselves. Then, as a result of reducing the weight of an undesirable path on the basis of the degrees to which the path parameters fall within predetermined ranges, it is possible to inhibit the generation of a path that makes the vehicle unstable. Accordingly, the vehicle control system 21 with high precision in vehicle control and high stability can be achieved.

Second Embodiment

A vehicle steering system that includes a path generation device and a vehicle control system according to the present embodiment will be described. In the following description, constituent elements similar to those described in the above embodiment are given the same reference signs, and detailed descriptions thereof will be appropriately omitted.

Configuration of Path Generation Device

Figure 16:
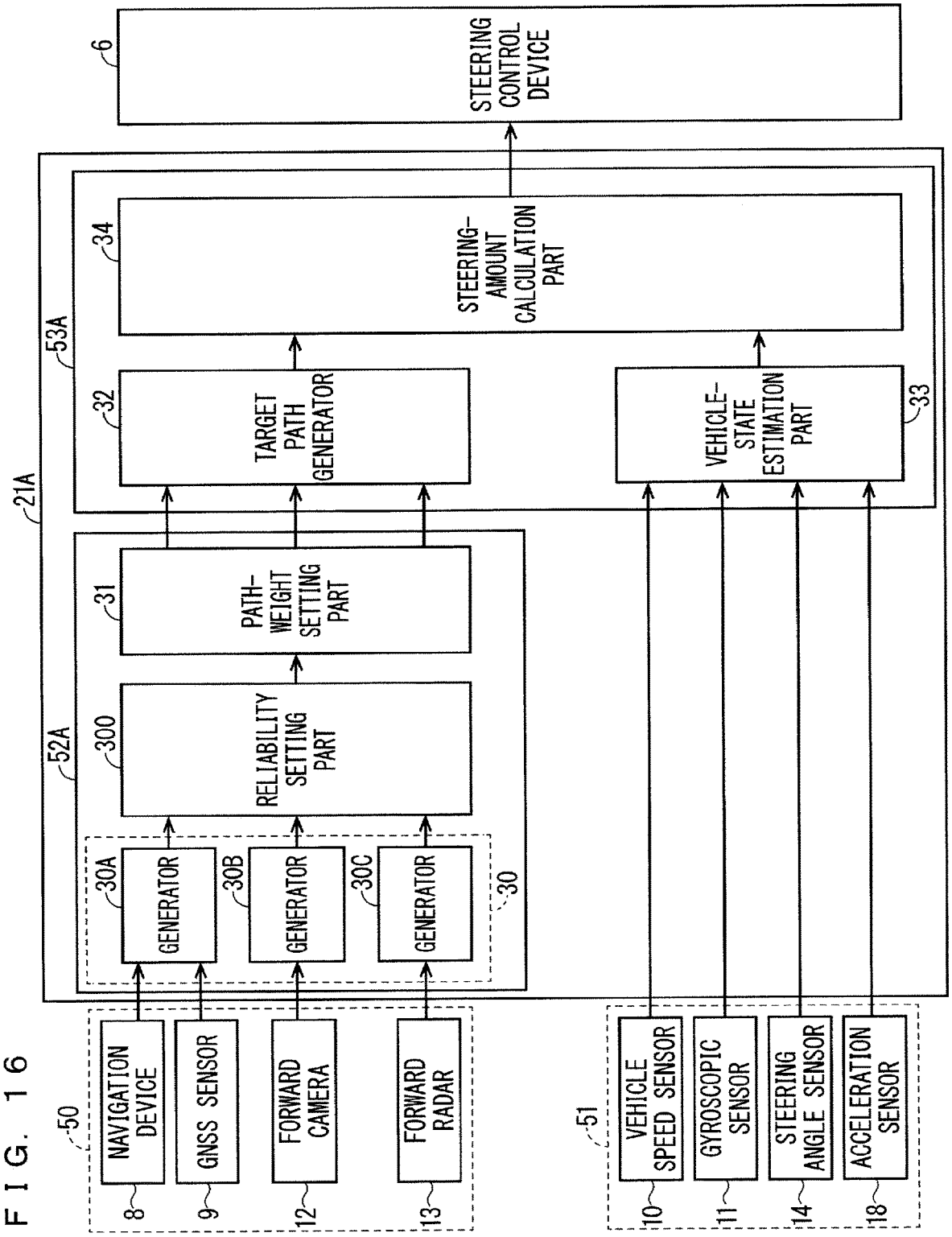
FIG. 16 is a functional block of the vehicle steering system according to the embodiment.

FIG. 16 is a functional block diagram of the vehicle steering system according to the present embodiment. As illustrated as an example in FIG. 16, the vehicle steering system includes a travel environment detector 50, a vehicle state detector 51, a vehicle control system 21A that receives input of outputs from the travel environment detector 50 and the vehicle state detector 51, and a steering control device 6 that receives input of an output from the vehicle control system 21A.

The vehicle control system 21A includes a path generation device 52A and a vehicle control device 53A. The path generation device 52A includes a path generator 30, a reliability setting part 300, and a path-weight setting part 31. The vehicle control device 53A includes a target path generator 32, a vehicle-state estimation part 33, and a steering-amount calculation part 34.

The path generation device 52A is a device that generates paths necessary for vehicle control, and functions independently when performing the above operation, for example even if not installed together with the vehicle control device 53A.

That is, in the vehicle steering system according to the present embodiment, the target path generator 32 is included, not in the path generation device 52A, but in the vehicle control device 53A.

This configuration allows the vehicle control device 53A to generate a target path and accordingly allows the vehicle control device 53A to recheck the reliability of each path in itself or to redefine the weight of each path. In this way, a double-check mechanism is configured, and accordingly the reliability of the vehicle control system is expected to improve.

Third Embodiment

A vehicle steering system that includes a path generation device and a vehicle control system according to the present embodiment will be described. In the following description, constituent elements similar to those described in the above embodiments are given the same reference signs, and redundant descriptions thereof will be appropriately omitted.

Configuration of Path Generation Device

In the second embodiment, a target path is generated by weighted averaging using a plurality of paths and the weight of each path. However, if a constrained optimization problem is repetitively solved using a dynamic vehicle model, it is possible to achieve vehicle control with higher precision and a greater degree of riding comfort.

Hereinafter, operations of the vehicle steering system according to the present embodiment will be described. Similar descriptions to those of the first and second embodiments will be omitted.

In the present embodiment, an optimum target steering amount is calculated by solving at regular intervals an optimization problem, in which, using a dynamic vehicle model that indicates the dynamics of the vehicle mathematically, the state during a period from the current time t to time Th (hereinafter, the time interval between time t to time Th may be abbreviated as a "horizon") is predicted to obtain a control input that minimizes an evaluation function J, the evaluation function representing a desired operation of the vehicle.

While integration is necessary in order to predict the vehicle state, a cause of deterioration in riding comfort, such as sudden steering, can be relieved by using a vehicle state quantity x0 at the current time t as an initial value for the integration and setting upper and lower limit values of the vehicle state quantity as constraints.

As described above, in the present embodiment, a constrained optimization problem expressed by Expression 100 below is solved at regular intervals.

$$\min_u J$$

$$s.t. x = f(x, u)$$

$$x_0 = x(t)$$

$$g(x, u) \leq 0 \quad \text{(Equation 100)}$$

Here, J is the evaluation function, x is the vehicle state quantity, u is the control input, f is the vector function with respect to the dynamic vehicle model, x0 is the vehicle state quantity at time t, and g is the function with respect to the constraints.

While the aforementioned optimization problem is handled as a minimization problem in the following description, the problem can also be handled as a maximization problem because it becomes equivalent to the maximization problem as a result of inverting the sign of the evaluation function.

Figure 19:
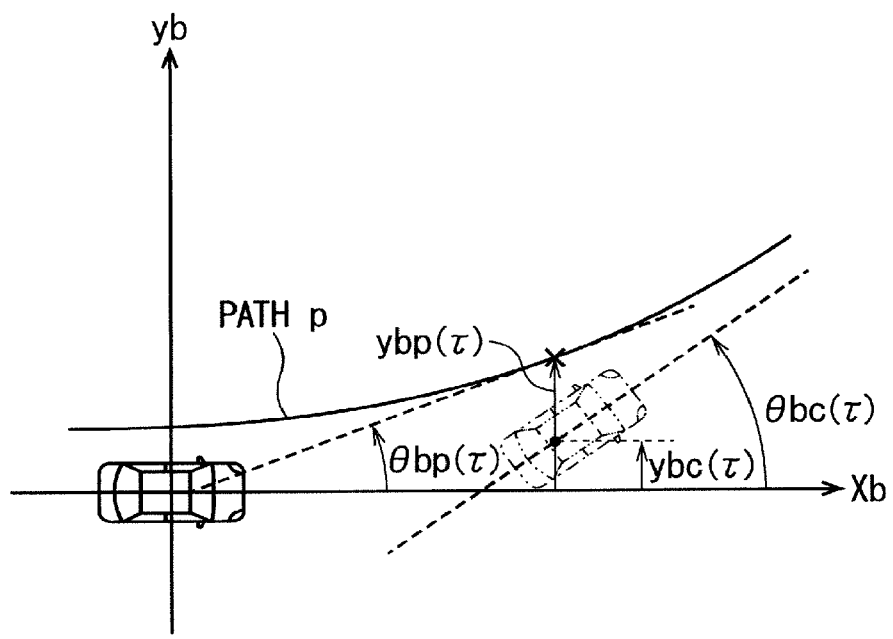
FIG. 19 is a diagram for describing symbols used in the embodiment.

FIG. 19 is a diagram for describing symbols used in the above-described present embodiment. The following description is given with reference to FIG. 19. In FIG. 19, the gravitational center position of the vehicle at time t corresponds to the origin of the xb and yb axes. The vehicle indicated by the dotted line indicates the predicted gravitational center position and orientation of the vehicle at time t+τ. The curve indicated by the solid line in FIG. 19 corresponds to the path p.

In the present embodiment, the vehicle state quantity x and the control input u are set as expressed by Expressions 101 and 102 below.

$$x = [x_{bc} y_{bc} \theta_{bc} \beta \gamma \delta]^T \quad \text{(Expression 101)}$$

$$u = s_\delta \quad \text{(Expression 102)}$$

Here, T at the upper right represents the transposition. Moreover, xbc is the xb coordinate of the vehicle in the vehicle coordinate system, ybc is the yb coordinate of the vehicle in the vehicle coordinate system, θbc is the orientation in the vehicle coordinate system, β is the angle of sideslip, γ is the yaw rate of the vehicle, δ is the steering angle, and $s_\sigma$ is the steering angular velocity.

As the dynamic vehicle model, a two-wheeled model expressed by Expression 103 below is used.

$$\frac{dx}{dt} = \begin{bmatrix} V\cos(\theta_{bc} + \beta) \\ V\sin(\theta_{bc} + \beta) \\ \gamma \\ -\gamma + \frac{2}{MV}(Y_f + Y_r) \\ \frac{2}{I}(l_f Y_f - l_r Y_r) \\ s_\delta \end{bmatrix} \quad \text{(Expression 103)}$$

Here, M is the mass of vehicle, V is the vehicle speed, γ is the yaw rate, I is the yaw moment of inertia of the vehicle, lf is the distance between the gravitational center of the vehicle and the front axle, lr is the distance between the gravitational center of the vehicle and the rear axle, Yf is the cornering force of the front wheels, and Yr is the cornering force of the rear wheels.

Since β≈0 is satisfied during normal driving, Yf and Yr can be approximated as follows, using cornering stiffness Cf of the front wheels and cornering stiffness Cr of the rear wheels, Cf and Cr being values unique to the vehicle.

$$Y_r = -C_f\left(\beta + \frac{l_f}{V}\gamma - \delta\right)$$

$$Y_r = -C_r\left(\beta - \frac{l_r}{V}\gamma\right)$$

Accordingly, the dynamic vehicle model f is expressed by Expression 104 below.

$$\frac{dx}{dt} = f(x, u) = \begin{bmatrix} V\cos(\theta_{bc} + \beta) \\ V\sin(\theta_{bc} + \beta) \\ \gamma \\ -\left(1 + \frac{2(C_f l_f - C_r l_r)}{MV^2}\right)\gamma - \frac{2}{MV}(C_f + C_r)\beta + \frac{2C_f}{MV}\sigma \\ -\frac{2}{IV}(C_f l_f^2 + C_r l_r^2)\gamma - \frac{2}{I}(C_f l_f - C_r l_r)\beta + \frac{2}{I}C_f l_f \sigma \\ s_\delta \end{bmatrix} \quad \text{(Expression 104)}$$

In the present embodiment, Expression 105 below is used as the evaluation function.

$$J = x_f^T P x_f + \int_t^{t+Th} [\Sigma_p^{Np}\{(z-z_p)^T \Omega_p (z-z_p)\} + x^T Q x + r \cdot s_\beta^2] d\tau \quad \text{(Expression 105)}$$

Here, t is the current time, Th is the horizon, τ is the time within the horizon, xf is the vehicle state quantity at time t+Th, p is the index representing the path p, and Np is the total number of paths.

In the evaluation function, z is a vector that summarizes ybc and the yaw angle θbc of the vehicle state predicted at time τ within the horizontal. That is, z is the vector expressed below:

$$z = [ybc, \theta bc]^T$$

Note that zp in the evaluation function is a vector that summarizes ybp of xbc in the path p and the angle θbp. That is, zp is the vector expressed below:

$$z = [ybp, \theta bp]^T$$

Here, the path p can be expressed by a cubic polynomial (Expression 106) below:

$$ybp = Cp3 \cdot xbc^3 + Cp2 \cdot xbc^2 + Cp1 \cdot xbc + Cp0 \quad \text{(Expression 106)}$$

Moreover, θbp can be obtained from Expression 107 below.

$$\theta bp = \tan^{-1}(3 \cdot Cp3 \cdot xbc^2 + 2 \cdot Cp2 \cdot xbc + Cp1) \quad \text{(Expression 107)}$$

Ωp in the evaluation function obtained by the path-weight setting part 31 is the matrix with the weight of the path p arranged diagonally, and is set as expressed by Expression 108 below, where ωp is the weight of the path p.

$$\Omega_p = \begin{bmatrix} \omega_p & 0 \\ 0 & \omega_p \end{bmatrix} \quad \text{(Expression 108)}$$

Here, Expression 109 below is extracted from the evaluation function.

$$\Sigma_p^{Np}\{(z-z_p)^T \Omega_p (z-z_p)\} \quad \text{(Expression 109)}$$

Expression 109 is the term that outputs a smaller value as a deviation of the predicted position and orientation of the vehicle from the position and orientation in the path p becomes smaller, and is evaluated by weighing using Ωp for each path p.

Accordingly, even if there is a large deviation from a lightly weighed path, the influence on the output of the evaluation function is small, and the output of the evaluation function increases as a deviation from a heavily weighed path becomes larger. Thus, vehicle control is performed such that the vehicle follows a heavily weighed path as much as possible.

Note that Q in the evaluation function is a matrix that is set to the magnitude of the quantity of state to which the vehicle state quantity is desired to be kept, and is usually set to a diagonal matrix.

That is, Q with respect to the vehicle state quantity x is set as expressed by Expression 110 below.

$$Q = \begin{pmatrix} q_1 & 0 & 0 & 0 & 0 \\ 0 & q_2 & 0 & 0 & 0 \\ 0 & 0 & q_3 & 0 & 0 \\ 0 & 0 & 0 & q_4 & 0 \\ 0 & 0 & 0 & 0 & q_5 \end{pmatrix} \quad \text{(Expression 110)}$$

Here, q1, q2, q3, q4, and q5 are constants for each quantity of state. Thus, the influence on the evaluation function increases as the values of q1, q2, q3, q4, q5 for each quantity of state increase. Accordingly, vehicle control is performed such that the magnitude of a corresponding variable is kept low.

Note that r in the evaluation function is a constant for the magnitude of the steering speed $s_\delta$. Thus, the influence on the evaluation function increases as the value of r increases. Accordingly, vehicle control is performed such that the magnitude of the control input is kept low.

A next description is given of the vector function g with respect to the constraints. The function g is used to set the vehicle state quantity x and the upper and lower limit values of the control input u in the constrained optimization problem, and this optimization is executed under the condition of g(x, u)≤0.

In the present embodiment, the constraints are as follows. That is, the vector function expressed by Expression 111 below is set, where $s_{\delta max}$(>0) is the upper limit value of the steering speed $s_\delta$, $s_{\delta min}$ (<0) is the lower limit value of the steering speed $S_\delta$, $\beta_{max}$(>0) is the upper limit value of the slip angle β, $\beta_{min}$(<0) is the lower limit value of the slip angle β, $\gamma_{max}$(>0) is the upper limit value of the yaw rate γ, $\gamma_{min}$ (<0) is the lower limit value of the yaw rate γ, $\delta_{max}$(>0) is the upper limit value of the steering angle δ, and $\delta_{min}$ (<0) is the lower limit value of the steering angle δ.

$$g = \begin{bmatrix} s_\delta - s_{\delta max} \\ s_\delta + s_{\delta min} \\ \beta - \beta_{max} \\ \beta + \beta_{min} \\ \gamma - \gamma_{max} \\ \gamma + \gamma_{min} \\ \delta - \delta_{max} \\ \delta + \delta_{min} \end{bmatrix} \quad \text{(Expression 111)}$$

By setting the vector function g in this way, the searing speed sδ, the slip angle β, the yaw rate γ, and the steering angle δ are optimized within the set upper and lower limit values.

By setting the upper and lower limit values of the slip angle β, the yaw rate γ, and the steering angle δ, it is possible to avoid dangerous vehicle movements. Also, vehicle control that ensures a great degree of riding comfort can be achieved by setting the upper and lower limit values of the steering speed sδ.

While the constraints are set in the present embodiment, these constraints may be eliminated. That is, a configuration that does not define the vector function g may be employed. In this case, no infeasible solutions are output from optimization problems due to the absence of constraints, and therefore it is possible to calculate an optimum solution with stability.

Figure 17:
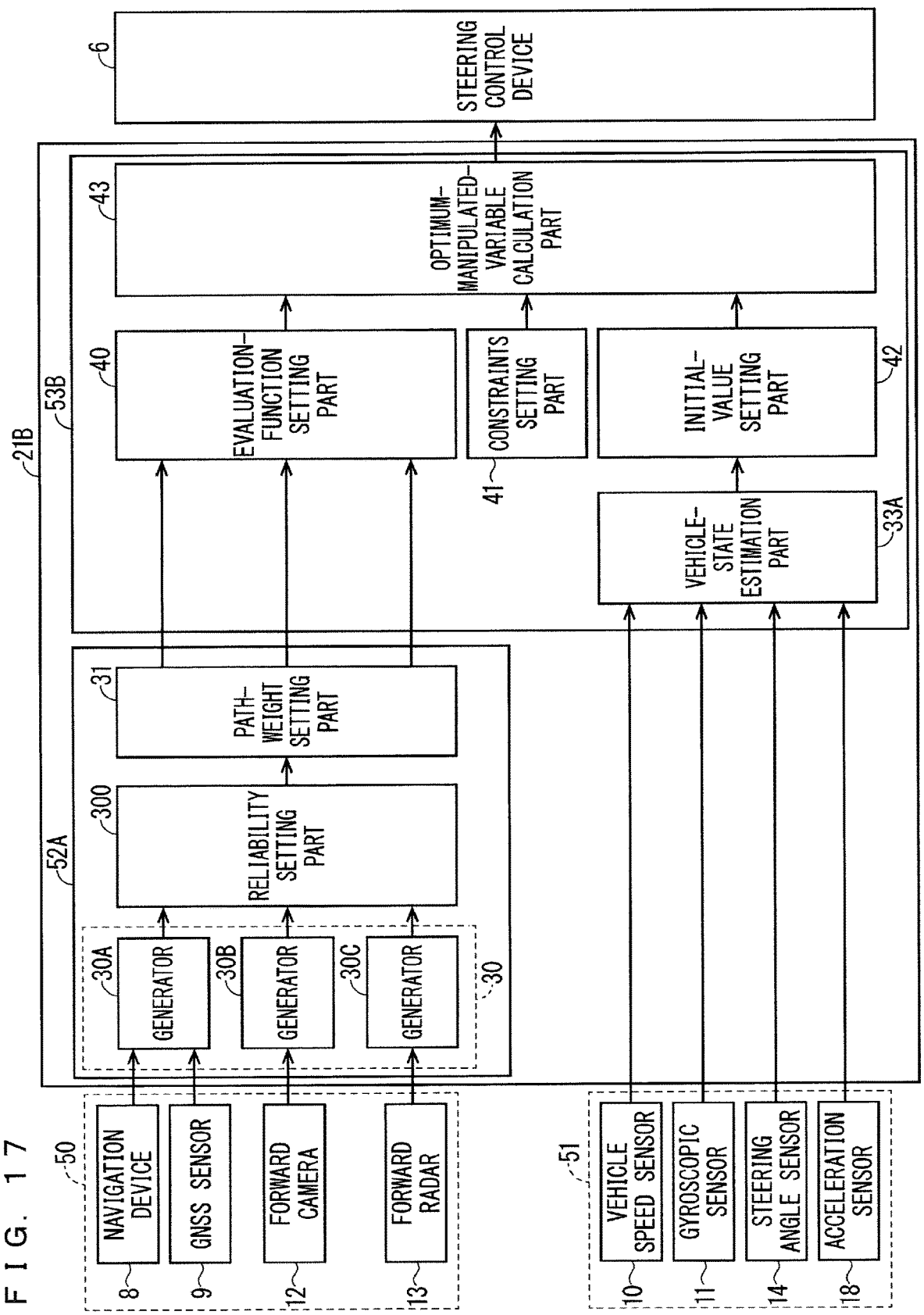
FIG. 17 is a functional block of the vehicle steering system according to the embodiment.

FIG. 17 is a functional block diagram of the vehicle steering system according to the present embodiment. As illustrated as an example in FIG. 17, the vehicle steering system includes a travel environment detector 50, a vehicle state detector 51, a vehicle control system 21B that receives input of outputs from the travel environment detector 50 and the vehicle state detector 51, and a steering control device 6 that receives input of an output from the vehicle control system 21B.

The vehicle control system 21B includes a path generation device 52A and a vehicle control device 53B. The path generation device 52A includes a path generator 30, a reliability setting part 300, and a path-weight setting part 31. The vehicle control device 53B includes a vehicle-state estimation part 33, an evaluation-function setting part 40, a constraints setting part 41, an initial-value setting part 42, and an optimum-manipulated-variable calculation part 43.

The path generation device 52A is a device that generates paths necessary for vehicle control, and functions independently when performing the above operation, for example even if not installed together with the vehicle control device 53B.

The evaluation-function setting part 40 sets the evaluation function, using a plurality of paths output from the path generation device 52A and the weight of each path set by the path-weight setting part 31.

The constraints setting part 41 sets the conditions for limiting the vehicle state. The initial-value setting part 42 sets the initial value for integration of optimization problems, using the estimated value of the vehicle state quantity output from the vehicle-state estimation part 33.

Using the evaluation function set by the evaluation-function setting part 40, the constraints set by the constraints setting part 41, and the initial value set by the initial-value setting part 42, the optimum-manipulated-variable calculation part 43 optimizes the set evaluation function with use of the set initial value and within the constraints.

Figure 18:
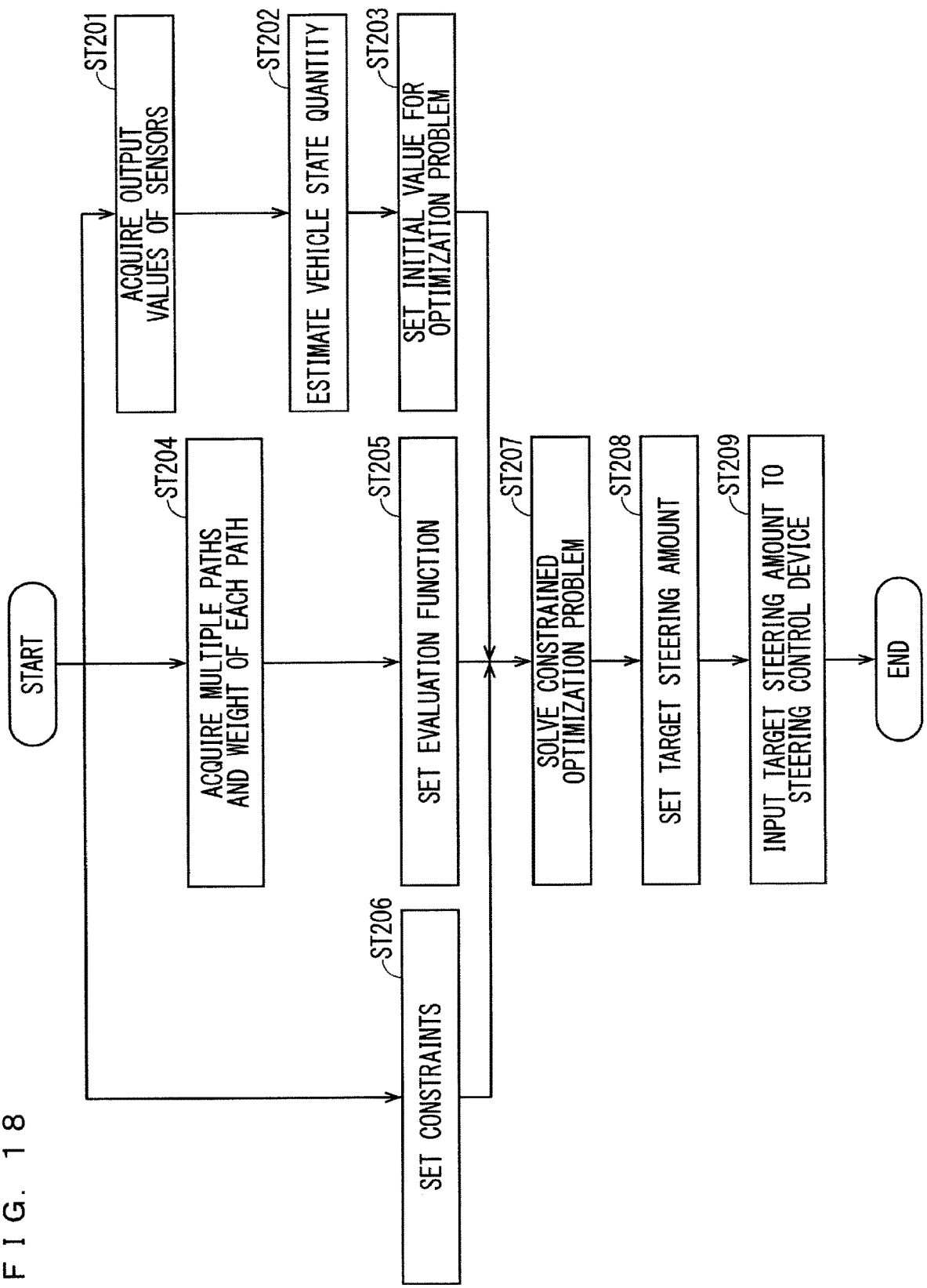
FIG. 18 is a flowchart illustrating a computational procedure used by the steering control system in the vehicle control system.

FIG. 18 is a flowchart illustrating a computational procedure used by the steering control system in the vehicle control system 21B. With reference to this flowchart, a technique for calculating a target steering amount will be described.

First, in step ST201, the vehicle state detector 51 acquires the output value of each sensor.

Next, in step ST202, the vehicle state quantity at the present moment is estimated using a technique similar to that used in step ST142 in FIG. 10.

Next, in step ST203, an initial value x0 for the optimization problem is set using the vehicle state quantity estimated in step ST202.

Meanwhile, in step ST204, the steering-amount calculation part 34 acquires a plurality of paths output from the path generation device 52A and the weight of each path.

Next, in step ST205, the evaluation function expressed by Expression 105 is set using the plurality of paths and the weight of each path acquired in step ST204.

Meanwhile, in step ST206, constraints on the constrained optimization problem, expressed by Expression 111, is set.

After all of steps ST203, ST205, and ST206, the procedure proceeds to step ST207.

Next, in step ST207, the constrained optimization problem is solved using the evaluation function set in step ST205, the constraints set in step ST206, and the initial value set in step ST203.

For example, AutoGen as an automatic code generation tool for solving optimization problems (reference: "Actual Application of Control By Real-Time Optimization," published by CORONA PUBLISHING CO., LTD) or ACADO (Automatic Control And Dynamic Optimization) developed by Catholic University of Leuven is on public view as a basis of the C/GMRES algorithm.

By setting the constrained optimization problem expressed by Expression 100 in such a tool and using codes generated by automatic code generation, it is possible to solve the constrained optimization problem.

Next, in step ST208, a target steering amount is set. In the case of using AutoGen or ACADO, the time interval from t to t+Th is divided into Nh intervals by a discrete interval h (i.e., h=T/Nh), and the constrained optimization problem is solved using the discrete interval. Thus, the outputs of step ST207 are a control input u* optimized for each discrete interval h during the period from t to Th, and vehicle state quantity x*. That is, the outputs of step ST207 are expressed by Expressions 112 and 113 below.

$$u^* = [s_{\delta_1} s_{\delta_2} \ldots s_{\delta_k} \ldots s_{\delta_{Nh-1}}]^T \quad \text{(Expression 112)}$$

$$x^* = [x_1^T x_2^T \ldots x_k^T \ldots x_{Nh}^T]^T \quad \text{(Expression 113)}$$

Here, $x_1$ in Expression 113 is an optimum state quantity at time t+h and is thus expressed as follows:

$$x_1 = [x_{bc1} y_{bc1} \theta_{bc1} \beta_1 \gamma_1 \delta_1]^T$$

Since the optimum target steering amount at time t+h is $\delta_1$, the target steering amount $\delta^*$ is set to $\delta_1$.

Next, the procedure proceeds to step ST209, and the target steering amount $\delta^*$ obtained in step ST208 is input to the steering control device 6. By so doing, it is possible to control the vehicle to follow the target path.

In this way, the vehicle control system 21B according to the present embodiment can achieve vehicle control that can reduce factors such as sudden steering that may deteriorate riding comfort, by predicting the operations of the vehicle and setting the upper and lower limit values of the vehicle state quantity as constraints with use of the dynamic vehicle model.

Fourth Embodiment

A vehicle steering system that includes a path generation device and a vehicle control system according to the present embodiment will be described. In the following description, constituent elements similar to those described in the above embodiments are given the same reference signs, and detailed descriptions thereof will be appropriately omitted.

Configuration of Path Generation Device

FIG. 20 is a functional block diagram of a vehicle steering system according to the present embodiment. As illustrated as an example in FIG. 20, the vehicle steering system includes a travel environment detector 50, a vehicle state detector 51, a vehicle control system 21C that receives inputs of outputs from the travel environment detector 50 and the vehicle state detector 51, and a steering control device 6 that receives input of an output from the vehicle control system 21C.

The vehicle control system 21C includes a path generation device 52C and a vehicle control device 53C. The path generation device 52C includes a path generator 30, a reliability setting part 300, a path-weight setting part 31, a vehicle-state estimation part 33A, an evaluation-function setting part 40, a constraints setting part 41, an initial-value setting part 42, and an optimum-path calculation part 44. The vehicle control device 53C includes a vehicle-state estimation part 33B and a steering-amount calculation part 34.

The path generation device 52C is a device that generates paths necessary for vehicle control, and functions independently when performing the above operation, for example even if not installed with the vehicle control device 53C.

The vehicle-state estimation part 33A and the vehicle-state estimation part 33B estimate a vehicle state quantity, using information output from each sensor in the vehicle state detector 51.

Using the evaluation function set by the evaluation-function setting part 40, the constraints set by the constraints setting part 41, and the initial value set by the initial-value setting part 42, the optimum-path calculation part 44 optimizes the set evaluation function with use of the set initial value and within the set constraints.

Using the evaluation function optimized by the optimum-path calculation part 44 and travel state data about the travel state of the vehicle, the steering-amount calculation part 34 calculates a target steering amount by which the vehicle is to travel along the target path indicated by the optimized evaluation function.

That is, in the vehicle steering system according to the present embodiment, the optimum-path calculation part 44 that performs the optimization operation is provided not in the vehicle control device 53C, but in the path generation device 52C.

In general, the vehicle control device has small calculation resources and thus has difficulty in achieving real-time optimization calculation. On the other hand, the path generation device can often ensure more calculation resources than the vehicle control device. Thus, if the optimization operation are performed in the path generation device 52C as in the present embodiment, it is possible to control the vehicle while more stably generating a path.

A computational procedure used by the steering control system according to the present embodiment is similar to that of the third embodiment until step ST207 in FIG. 18.

Thus, the results of Expressions 112 and 113 are also obtained in the present embodiment. At this time, an optimum path can be calculated as follows.

Specifically, Expression 113 expresses the time history of the quantity state, optimized for each discrete interval h during the period of time from the current time t to the horizon Th. Thus, if the time histories of xbc and ybc are acquired from x*, the results can be used as an optimum path.

That is, an optimum path can be obtained by acquiring Nh xbc and Nh ybc from x* and approximating them by a polynomial or a spline curve. Then, the obtained optimum path is output to the vehicle control device 53C so as to control the vehicle to follow the optimum path.

This configuration allows the path generation device 52C to perform high-load calculation operations, and thereby achieves stable path generation. Besides, the vehicle control device 53C can also be used in other operations, which leads to a reduction in the rate of development.

Effects Achieved by Above-Described Embodiments

A next description is given of examples of the effects achieved by the above-described embodiments. In the following description, the effects are described based on the specific configurations illustrated as examples in the above-described embodiments, but these configurations may be replaced by other specific configurations illustrated as examples in the specification of the present invention as long as similar effects can be achieved.

Such replacement may be made across a plurality of embodiments. That is, similar effects may be achieved by a combination of configurations illustrated as examples in different embodiments.

According to the above-described embodiments, the path generation device includes the path generator 30, the reliability setting part 300, and the path-weight setting part 31. The path generator 30 generates a plurality of paths along which the vehicle is to travel, in association with each piece of environment measurement data about a travel environment of the vehicle detected by a plurality of detectors, i.e., detectors including the GNSS sensor 9, the forward camera 12, and the forward radar 13. The reliability setting part 300 sets the reliability of each path in itself generated by the path generator 30, the reliability corresponding to the degree to which the path falls within a predetermined range. Specifically, the ranges of values that the path parameters can take to represent each path are set in advance, and the reliability of the path in itself is set such that, if any of the path parameters falls outside the predetermined range, the reliability of this path parameter is reduced. The path-weight setting part 31 sets the weight of each path on the basis of the reliability of the path in itself.

According to the above-described embodiments, the path generation device includes a processing circuit that executes programs, and a storage device that stores programs to be executed. The following operations are implemented by the processing circuit executing the programs.

Specifically, a plurality of paths along which the vehicle is to travel is generated in association with each piece of environment measurement data about a travel environment of the vehicle detected by a plurality of detectors. Then, for each of the generated paths, the reliability path of the path in itself is set, the reliability corresponding to the degree to which a variation in the path falls within a predetermined range. Then, the weight of each path is set based on the reliability of the path in itself.

According to the above-described embodiments, the path generation device includes a processing circuit that is dedicated hardware. Then, the processing circuit or dedicated hardware performs the following operations.

Specifically, the processing circuit or dedicated hardware generates a plurality of paths along which the vehicle is to travel, in association with each piece of environment measurement data about a travel environment of the vehicle detected by a plurality of detectors. Then, for each of the generated paths, the processing circuit sets the reliability of the path in itself, the reliability corresponding to the degree to which a variation in the path falls within a predetermined range. The processing circuit then sets the weight of each path on the basis of the reliability of the path in itself.

This configuration can inhibit the generation of paths that make the vehicle unstable while considering the direction of the path, by reducing the weight (i.e., priority) of an undesirable path on the basis of the degree to which a variation in the path falls within the predetermined range. Accordingly, it is possible to achieve the vehicle control system 21 with high precision in vehicle control and with high stability.

Note that configurations other than those described above and illustrated as examples in the specification of the present application may be appropriately omitted. That is, the effects described above can be achieved as long as at least the above-described configurations are provided.

However, similar effects can also be achieved by appropriately adding at least one of other configurations illustrated as examples in the specification of the present application to the above-described configurations, i.e., by appropriately adding other configurations that are not referred to in the above-described configurations but illustrated as examples in the specification of the present application.

According to the above-described embodiments, the path generator 30 generates a plurality of paths sequentially over time. Then, the reliability setting part 300 sets the reliability of a path in itself to be lower in the case where a variation in any of the path parameters of the path from the path parameter of a corresponding path generated one generation cycle before the path is greater than the threshold value (i.e., one of $\Delta Cpt0$, $\Delta Cpt1$, $\Delta Cpt2$, and $\Delta Cpt3$) than in the case where the variation is smaller than the threshold value (i.e., one of $\Delta Cpt0$, $\Delta Cpt1$, $\Delta Cpt2$, and $\Delta Cpt3$). This configuration enables independently setting the reliability of each path parameter that varies greatly from the path generated one generation cycle before.

According to the above-described embodiments, the weights set by the path-weight setting part 31 are smaller in the case where the reliability of the path in itself is lower than a second threshold value than in the case where the reliability of the path is higher than the second threshold value. This configuration enables setting the weights on the basis of the reliability of the path in itself and comparing the priorities of a plurality of paths.

According to the above-described embodiments, the lane for the path is estimated based on the environment measurement data, and the weight set by the path-weight setting part 31 is smaller in the case where the path deviates from the lane than in the case where the path does not deviate from the lane. This configuration enables setting the weight depending on whether the path deviates from the lane and excluding, for example, a path that obviously deviates from the lane.

According to the above-described embodiments, the path generation device includes the target path generator 32 that generates a single target path, using the plurality of paths whose weights have been set. This configuration enables generating a single target path along which the vehicle is to travel, from a plurality of paths while considering the set weight of each path.

According to the above-described embodiments, the target path generator 32 generates a single target path by weighted averaging using a plurality of paths whose weights have been set. This configuration enables generating a single target path along which the vehicle is to travel, through weighted averaging using a plurality of paths while considering the set weight of each path.

According to the above-described embodiments, the path generation device includes the evaluation-function setting part 40, the constraints setting part 41, the initial-value setting part 42, and an optimization part. The optimization part as used herein corresponds to, for example, the optimum-path calculation part 44. The evaluation-function setting part 40 sets the evaluation function using a plurality of paths whose weights have been set. The constraints setting part 41 sets predicted upper and lower limit values of the state quantity of the vehicle as constraints. The initial-value setting part 42 sets the vehicle state quantity at the present moment as an initial value for optimization. The optimum-path calculation part 44 optimizes the evaluation function, using the constraints and the initial value as conditions for optimization. This configuration allows the path generation device to perform high-load calculation operations and thereby enables achieving stable path generation.

According to the above-described embodiments, the vehicle control system includes the path generation device and the vehicle control device. The vehicle control device includes a calculation part. The calculation part as used herein corresponds to, for example, the steering-amount calculation part 34. The steering-amount calculation part 34 calculates a target steering amount by which the vehicle is to travel along the target path, using the single target path generated by the path generation device and travel state data about a travel state of the vehicle. This configuration enables achieving vehicle control that ensures a great degree of riding comfort while inhibiting the generation of paths that make the vehicle unstable, with use of the travel state data and the single target path based on the weight of each path.

According to the above-described embodiments, the steering-amount calculation part 34 calculates the target steering amount, using the vehicle state quantity of the vehicle in the single target path, the vehicle state quantity being estimated based on the curvature of the target path, the amount of lateral deviation, the amount of angular deviation, and the travel state data at a forward look ahead point that is set forward of the vehicle. This configuration enables achieving vehicle control that ensures a great degree of riding comfort while inhibiting the generation of paths that make the vehicle unstable, with use of the signal target path based on the weight of each path and the vehicle state quantity.

According to the above-described embodiments, the vehicle control system includes the path generation device and the vehicle control device. The vehicle control device includes the target path generator 32 and the steering-amount calculation part 34. The target path generator 32 generates a single target path, using a plurality of paths whose weights have been set. The steering-amount calculation part 34 calculates a target steering amount by which the vehicle is to travel along the target path, using the single target path and the travel state data about the travel state of the vehicle. This configuration allows the vehicle control device to generate a target path and thereby allows the vehicle control device to reconfirm the reliability of the path in itself or to reset the weight of the path.

According to the above-described embodiments, the vehicle control system includes the path generation device and the vehicle control device. The vehicle control device includes the evaluation-function setting part 40, the constraints setting part 41, the initial-value setting part 42, and a calculation part. The calculation part as used herein corresponds to, for example, the optimum-manipulated-variable calculation part 43. The evaluation-function setting part 40 sets the evaluation function, using a plurality of paths whose weights have been set by the path generation device.

The constraints setting part 41 sets predicted upper and lower limit values of the vehicle state quantity of the vehicle as constraints. The initial-value setting part 42 sets the vehicle state quantity at the present moment as an initial value for optimization. The optimum-manipulated-variable calculation part 43 optimizes the evaluation function, using the constraints and the initial value as conditions for optimization, and calculates the target steering amount by which the vehicle is to travel along the target path indicated by the optimized evaluation function. This configuration enables achieving vehicle control that can reduce factors such as sudden steering that may deteriorate driving comfort, by predicting the operations of the vehicle and setting the upper and lower limit values of the vehicle state quantity as constraints with use of the dynamic vehicle model.

According to the above-described embodiments, the vehicle control system includes the path generation device and the vehicle control device. The vehicle control device includes the steering-amount calculation part 34. Using the optimized evaluation function and the travel state data about the travel state of the vehicle, the steering-amount calculation part 34 calculates the target steering amount by which the vehicle is to travel along the target path indicated by the optimized evaluation function. This configuration allows the path generation device to perform high-load calculation operations and thereby enables achieving stable path generation.

According to the above-described embodiments, the steering-amount calculation part 34 calculates the target steering amount, using the optimized evaluation function and the vehicle state quantity of the vehicle estimated based on the travel state data. This configuration enables achieving vehicle control that ensures a great degree of riding comfort while inhibiting the generation of paths that make the vehicle unstable, with use of the single target path based on the weight of each path and the vehicle state quantity.

Variations of Above-Described Embodiments

While the above-described embodiments have described conditions for implementation or the dimensions, shape, and relative locations and arrangement of each constituent element, these features are all illustrative in all aspects and are not limited to the examples described in the specification of the present application.

Accordingly, an unlimited number of variations and equivalents that are not exemplified are assumed to fall within the scope of the technique disclosed in the specification of the present application. For example, the scope of the technique is assumed to include cases, such as where at least one constituent element is modified, added, or omitted and where at least one constituent element described in at least one embodiment is extracted and combined with constituent elements described in other embodiments.

In the above-described embodiments, "one" constituent element may include "one or more" constituent elements as long as no contradiction arises.

Each constituent element in the above-describe embodiments is perceived as a conceptual unit, and the scope of the technique disclosed in the specification of the present application is assumed to include cases where one constituent element is configured by a plurality of structural elements, where one constituent element corresponds to part of a given structural element, and where a plurality of constituent elements is included in one structural element.

Each constituent element described in the above-described embodiments is assumed to include structural elements having other structures or shapes as long as the constituent element has the same function.

The description in the specification of the present application shall be referred to for all purposes relating to the technique of the present application, and nothing in the specification shall be regarded as conventional technology.

Each constituent element described in the above-described embodiments is assumed to be software, firmware, or hardware corresponding to software or firmware, and in both of the concepts, each constituent element is referred to, for example, a "part" or a "processing circuit."

EXPLANATION OF REFERENCE SIGNS

1: steering wheel, 2: steering shaft, 3: electric motor, 4: rack-and-pinion mechanism, 5: motor drive, 6: steering control device, 8: navigation device, 9: GNSS sensor, 10: speed sensor, 11: gyroscopic sensor, 12: forward camera, 13: forward radar, 14: steering angle sensor, 15: steering torque sensor, 16: tie rod, 17: front knuckle, 18: acceleration sensor, 20: real vehicle, 21, 21A, 21B, 21C: vehicle control system, 22: front wheel, 23: rear wheel, 30: path generator, 30A, 30B, 30C: generator, 31: path-weight setting part, 32: target path generator, 33, 33A, 33B: vehicle-state estimation part, 34: steering-amount calculation part, 40: evaluation-function setting part, 41: constraints setting part, 42: initial-value setting part, 43: optimum-manipulated-variable calculation part, 44: optimum-path calculation part, 50: travel environment detector, 50: structure, 51: vehicle state detector, 52, 52A, 52C: path generation device, 53, 53A, 53B, 53C: vehicle control device, 60: object, 70: preceding vehicle, 300: reliability setting part.

The invention claimed is:
1. A path generation device comprising:
one or more first processors configured to execute a first program; and
one or more first memories configured to store the first program which, when the first program is executed by the one or more first processors, causes the one or more first processors to perform first processes comprising:
generating a plurality of paths along which a vehicle should travel, in accordance with each piece of environment measurement data about a travel environment of the vehicle detected by a plurality of detectors;
setting, for the plurality of paths, reliability of each of the paths in itself based on reliability of a path parameter being a polynomial coefficient representing the path, the reliability of the path itself corresponding to a degree to which a variation in the path falls within a predetermined range;
the reliability of the path in itself is set according to:

$$R_p = \prod_{i=0}^{N} R_{pi}$$

$$R_{pi} = \begin{cases} 0, & \text{if } |c_{pi} - c_{pib}| \leq \Delta c_{pti} \\ e^{\alpha_i(c_{pi} - c_{pib})}, & \text{else} \end{cases} \quad i = 0, \ldots, N$$

where N is an integer equal to or greater than one, $R_p$ is the reliability of the path in itself, $\alpha$ is an adjusted parameter, $c_{pi}$ is the path parameter of the path, $c_{pib}$ is the path parameter of the path generated one generation cycle before, $\Delta C_{pt}$ is a threshold value of a rate of the path parameter;
setting a weight for each of the plurality of paths based on the reliability of the path in itself;
generating a single target path from among the generated plurality of paths based on the set weight of each of the plurality of paths; and
outputting the single target path to a vehicle control device which outputs a target steering amount and controlling the vehicle according to the generated single target path from among the generated plurality of paths.

2. The path generation device according to claim 1, wherein
the process of generating the path is the process of generating a plurality of paths sequentially over time, and
the process of setting the reliability is the process of setting the reliability of each path in itself to be lower in a case where a variation in the path from a corresponding path generated before the path is greater than a first threshold value than in a case where the variation is smaller than the first threshold value.

3. The path generation device according to claim 1, wherein
the set weight is smaller in a case where the reliability of the path in itself is lower than a second threshold value than in a case where the reliability of the path in itself is higher than the second threshold value.

4. The path generation device according to claim 1, wherein
a lane for the path is estimated based on the environment measurement data, and
the set weight is smaller in a case where the path deviates from the lane than in a case where the path does not deviate from the lane.

5. The path generation device according to claim 1, wherein the process of generating the target path is the process of generating the single target path by weighted averaging using the plurality of paths whose weights have been set.

6. The path generation device according to claim 1, wherein the first process further comprises:
setting an evaluation function, using the plurality of paths whose weights have been set;
setting predicted upper and lower limit values of a vehicle state quantity of the vehicle as constraints;
setting the vehicle state quantity at a present moment as an initial value for optimization; and
optimizing the evaluation function, using the constraints and the initial value as conditions for optimization.

7. A vehicle control system comprising:
the path generation device according to claim 6; and
a vehicle control device,
the vehicle control device including:
one or more second processors configured to execute a second program; and one or more second memories configured to store the second program which, when the second program is executed by the one or more second processors, causes the one or more second processors to perform second processes including:
calculating a target steering amount by which the vehicle is to travel along a target path indicated by the optimized evaluation function, using the optimized evaluation function and travel state data about a travel state of the vehicle.

8. The vehicle control system according to claim 7, wherein
the process of calculating the target steering amount is the process of calculating the target steering amount, using the optimized evaluation function and a vehicle state quantity of the vehicle, the vehicle state quantity being estimated based on the travel state data.

9. A vehicle control system comprising:
the path generation device according to claim 1; and
a vehicle control device,
the vehicle control device including:
one or more second processors configured to execute a second program;
and one or more second memories configured to store the second program which, when the second program is executed by the one or more second processors, causes the one or more second processors to perform second processes including:
calculating, using the single target path and travel state data about a travel state of the vehicle, a target steering amount by which the vehicle is to travel along the target path.

10. A vehicle control system comprising:
the path generation device according to claim 1; and
a vehicle control device,
the vehicle control device including:
one or more second processors configured to execute a second program; and
one or more second memories configured to store the second program which, when the second program is executed by the one or more second processors, causes the one or more second processors to perform second processes including:
setting an evaluation function, using the plurality of paths whose weights have been set by the path generation device;
setting predicted upper and lower limit values of a vehicle state quantity of the vehicle as constraints;
setting the vehicle state quantity at a present moment as an initial value for optimization; and
optimizing the evaluation function, using the constraints and the initial value as conditions for optimization, and calculating a target steering amount by which the vehicle is to travel along a target path indicated by the optimized evaluation function.

11. The path generation device according to claim 1, wherein
only one of the generated plurality of paths has a non-zero value for the set weight so as to generate the generated single target path.

12. The path generation device according to claim 1, wherein
the plurality of detectors have different detection modalities.

13. The path generation device according to claim 1, wherein
said generating the single target path is based on the set weights of all of the generated paths, which are generated at the same time,
the variation in the path falling within the predetermined range is a lane deviation,
for said setting, for all generated paths of the plurality of paths generated at the same time, the reliability of each of the paths in itself, the reliability corresponds to the degree to which the variation in the path falls within the predetermined range.

14. The path generation device according to claim 1, wherein
the single target path is set according to:

$$y_b = \Sigma_{i=0}^{N} C_{wi} x_b^i$$

wherein $$C_{wi} = (\omega_g \cdot C_{gi} + \omega_c \cdot C_{ci} + \omega_r \cdot C_{ri})/\omega_w$$

where N is an integer equal to or greater than one, $y_b$ is a target path indicated by an N-th degree polynomial, $\omega_g$ is a weight output from a first detector, @ is a weight output from a second detector, $\omega_r$ is a weight output from a third detector, $C_g$ is a parameter of an N-th degree polynomial output from the first detector as a path, $C_c$ is a parameter of an N-th degree polynomial output from the second detector as a path, $C_r$ is a parameter of an N-th degree polynomial output from the third detector as a path.

15. A vehicle control system comprising:
a path generation device; and
a vehicle control device, the vehicle control device including:

one or more second processors configured to execute a second program; and one or more second memories configured to store the second program which, when the second program is executed by the one or more second processors, causes the one or more second processors to perform second processes including:

calculating a target steering amount by which the vehicle is to travel along the target path, using the single target path generated by the path generation device and travel state data about a travel state of the vehicle, wherein the path generation device includes:

one or more first processors configured to execute a first program; and one or more first memories configured to store the first program which, when the first program is executed by the one or more first processors, causes the one or more first processors to perform first processes comprising:

generating a plurality of paths along which a vehicle should travel, in accordance with each piece of environment measurement data about a travel environment of the vehicle detected by a plurality of detectors;

setting, for the plurality of paths, reliability of each of the paths in itself based on reliability of a path parameter being a polynomial coefficient representing the path, the reliability of the path in itself corresponding to a degree to which a variation in the path falls within a predetermined range;

the reliability of the path in itself is set according to:

$$R_p = \prod_{i=0}^{N} R_{pi}$$

$$R_{pi} = \begin{cases} 0, & \text{if } |c_{pi} - c_{pib}| \leq \Delta c_{pti} \\ e^{\alpha_I(c_{pi} - c_{pib})}, & \text{else} \end{cases} \quad i = 0, \ldots, N$$

where N is an integer equal to or greater than one, $R_p$ is the reliability of the path in itself, a is an adjusted parameter, $c_{pi}$ is the path parameter of the path, $c_{pib}$ is the path parameter of the path generated one generation cycle before, $\Delta c_{pt}$ is a threshold value of a rate of the path parameter;

setting a weight for each of the plurality of paths based on the reliability of the path in itself;

generating a single target path from among the generated plurality of paths based on the set weight of each of the plurality of paths; and outputting the single target path to a vehicle control device which outputs a target steering amount and controlling the vehicle according to the generated single target path from among the generated plurality of paths.

16. The vehicle control system according to claim 15, wherein the process of calculating the target steering amount is the process of calculating the target steering amount using a vehicle state quantity of the vehicle in the single target path, the vehicle state quantity being estimated based on a curvature of the target path, an amount of lateral deviation, an amount of angular deviation, and the travel state data at a forward look ahead point that is set forward of the vehicle.

17. The vehicle control system according to claim 15, wherein only one of the generated plurality of paths has a non-zero value for the set weight so as to generate the generated single target path.

18. The vehicle control system according to claim 15, wherein the plurality of detectors have different detection modalities.

\* \* \* \* \*